(12) United States Patent
Shiraishi et al.

(10) Patent No.: US 7,194,580 B2
(45) Date of Patent: Mar. 20, 2007

(54) DISK ARRAY DEVICE, METHOD OF EXTENDING STORAGE CAPACITY AND COMPUTER PROGRAM

(75) Inventors: Kazuya Shiraishi, Osaka (JP); Hirohiko Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 10/947,266

(22) Filed: Sep. 23, 2004

(65) Prior Publication Data

US 2005/0063217 A1    Mar. 24, 2005

(30) Foreign Application Priority Data

Sep. 24, 2003    (JP)    ............................. 2003-331329

(51) Int. Cl.
*G06F 11/20*    (2006.01)
(52) U.S. Cl. ...................................... 711/114
(58) Field of Classification Search ................ 711/114, 711/165, 170; 714/7
See application file for complete search history.

(56) References Cited

U.S. PATENT DOCUMENTS

| | | | | |
|---|---|---|---|---|
| 5,502,836 | A | * | 3/1996 | Hale et al. ................... 711/170 |
| 5,524,204 | A | * | 6/1996 | Verdoorn, Jr. ................ 714/6 |
| 5,615,352 | A | * | 3/1997 | Jacobson et al. ............. 711/114 |
| 6,000,010 | A | * | 12/1999 | Legg ........................... 711/114 |
| 6,035,373 | A | * | 3/2000 | Iwata .......................... 711/114 |
| 6,052,759 | A | * | 4/2000 | Stallmo et al. .............. 711/114 |
| 2003/0145167 | A1 | * | 7/2003 | Tomita ........................ 711/114 |
| 2004/0133743 | A1 | * | 7/2004 | Ito et al. ..................... 711/114 |
| 2005/0102551 | A1 | * | 5/2005 | Watanabe ...................... 714/5 |
| 2005/0166085 | A1 | * | 7/2005 | Thompson et al. ............ 714/6 |

FOREIGN PATENT DOCUMENTS

| | | | |
|---|---|---|---|
| JP | 07-141121 | A | 6/1995 |
| JP | 08-115173 | A | 5/1996 |
| JP | 08-221216 | A | 8/1996 |
| JP | 2000-010738 | A | 1/2000 |

OTHER PUBLICATIONS

"RAID Subsystems G Series (Desktop Model, 19" Rack Model) Handling Manual", P/N A207750, Revision 4.4.
"Raid Subsystems G Series (Desktop Model, 19 "Rack Model) Handling Manual", P/N A207750, Revision 4.4.

* cited by examiner

*Primary Examiner*—Kevin L. Ellis
(74) *Attorney, Agent, or Firm*—Sughrue Mion, PLLC

(57) ABSTRACT

If a disk array device according to the invention initially has four disk devices, which is the smallest number of disk devices for RAID5 (3D+P), the storage region of each of the four disk devices is equally divided by four to produce partitions. Then, four partitions are selected respectively from the four disk devices and combined to form a redundancy group so that a total of four redundancy groups are formed. When another disk device is added, its storage region is also equally divided by four. Four partitions are selected from the four redundancy groups, one from each of the disk devices, and the data of the selected four partitions are copied to the four partitions of the added disk device. After the completion of the copying, the origin of copying partitions are excluded from the original redundancy groups and the corresponding four destination of copying partitions are incorporated to replace the excluded partitions. The four origin of copying partitions excluded from the original redundancy groups are combined to generate a new redundancy group.

75 Claims, 14 Drawing Sheets

1ST REDUNDANCY GROUP : 100,101,102,103
2ND REDUNDANCY GROUP : 110,111,112,113
3RD REDUNDANCY GROUP : 120,121,122,123
4TH REDUNDANCY GROUP : 130,131,132,133

1ST REDUNDANCY GROUP : 100,101,102,103
2ND REDUNDANCY GROUP : 110,111,112,113
3RD REDUNDANCY GROUP : 120,121,122,123
4TH REDUNDANCY GROUP : 130,131,132,133

1ST REDUNDANCY GROUP : 100,101,102,103
2ND REDUNDANCY GROUP : 110,111,112,113
3RD REDUNDANCY GROUP : 120,121,122,123
4TH REDUNDANCY GROUP : 130,131,132,133

1ST REDUNDANCY GROUP : 104,101,102,103
2ND REDUNDANCY GROUP : 114,111,112,113
3RD REDUNDANCY GROUP : 124,121,122,123
4TH REDUNDANCY GROUP : 134,131,132,133
5TH REDUNDANCY GROUP : 140,141,142,143

1ST REDUNDANCY GROUP : 104,105,102,103
2ND REDUNDANCY GROUP : 114,115,113,112
3RD REDUNDANCY GROUP : 124,125,122,123
4TH REDUNDANCY GROUP : 134,135,132,133
5TH REDUNDANCY GROUP : 140,141,142,143
6TH REDUNDANCY GROUP : 150,151,152,153

1ST REDUNDANCY GROUP : 104,105,106,107
2ND REDUNDANCY GROUP : 114,115,116,117
3RD REDUNDANCY GROUP : 124,125,126,127
4TH REDUNDANCY GROUP : 134,135,136,137
5TH REDUNDANCY GROUP : 140,141,142,143
6TH REDUNDANCY GROUP : 150,151,152,153
7TH REDUNDANCY GROUP : 160,161,162,163
8TH REDUNDANCY GROUP : 170,171,172,173

FIG. 10

CONTROL TABLE FOR ORDINARY STATE

| | | | | | | | | | | | | |
|---|---|---|---|---|---|---|---|---|---|---|---|---|
| 41 | STATE | ORDINARY | | | | | | | | | | |
| 42 | RAID TYPE | RAID5 | | | | | | | | | | |
| 43 | NUMBER OF REDUNDANCY GROUPS | 4 | | | | | | | | | | |
| 44 | NUMBER OF PARTITIONS OF EACH REDUNDANCY GROUP | 4 | | | | | | | | | | |
| 45 | NUMBER OF TIMES OF ADDITION | 0 | | | | | | | | | | |

| | CONFIGURATION MANAGEMENT | REDUNDANCY GROUP | DISK NO. {49} | | | | PARTITION POSITION {50} | | | | PARTITION NO. {51} | | | |
|---|---|---|---|---|---|---|---|---|---|---|---|---|---|---|
| 47 | ORDINARY CONFIGURATION | 1ST | 20 | 21 | 22 | 23 | 0 | 1 | 2 | 3 | 100 | 101 | 102 | 103 |
| | | 2ND | 21 | 22 | 23 | 20 | 0 | 1 | 2 | 3 | 110 | 111 | 112 | 113 |
| | | 3RD | 22 | 23 | 20 | 21 | 0 | 1 | 2 | 3 | 120 | 121 | 122 | 123 |
| | | 4TH | 23 | 20 | 21 | 22 | 0 | 1 | 2 | 3 | 130 | 131 | 132 | 133 |
| 48 | ADDITION-CAUSED CONFIGURATION | 1ST | | | | | | | | | | | | |
| | | 2ND | | | | | | | | | | | | |
| | | 3RD | | | | | | | | | | | | |
| | | 4TH | | | | | | | | | | | | |

{46} encompasses the DISK NO., PARTITION POSITION, and PARTITION NO. columns.

FIG.12

CONTROL TABLE FOR ORDINARY STATE — 41

| | |
|---|---|
| STATE (42) | ADDITION |
| RAID TYPE (43) | RAID5 |
| NUMBER OF REDUNDANCY GROUPS (44) | 4 |
| NUMBER OF PARTITIONS OF EACH REDUNDANCY GROUP | 4 |
| NUMBER OF TIMES OF ADDITION (45) | 1 |

| CONFIGURATION MANAGEMENT | REDUNDANCY GROUP | DISK NO. (49) | | | | PARTITION POSITION (50) | | | | PARTITION NO. (51) | | | |
|---|---|---|---|---|---|---|---|---|---|---|---|---|---|
| ORDINARY CONFIGURATION (47) | 1ST | 20 | 21 | 22 | 23 | 0 | 1 | 2 | 3 | 100 | 101 | 102 | 103 |
| | 2ND | 21 | 22 | 23 | 20 | 0 | 1 | 2 | 3 | 110 | 111 | 112 | 113 |
| | 3RD | 22 | 23 | 20 | 21 | 0 | 1 | 2 | 3 | 120 | 121 | 122 | 123 |
| | 4TH | 23 | 20 | 21 | 22 | 0 | 1 | 2 | 3 | 130 | 131 | 132 | 133 |
| ADDITION-CAUSED CONFIGURATION (48) | 1ST | 24 | 21 | 22 | 23 | 1 | 1 | 2 | 3 | 104 | 101 | 102 | 103 |
| | 2ND | 24 | 22 | 23 | 20 | 2 | 1 | 2 | 3 | 114 | 111 | 112 | 113 |
| | 3RD | 24 | 23 | 20 | 21 | 3 | 1 | 2 | 3 | 124 | 121 | 122 | 123 |
| | 4TH | 24 | 21 | 22 | | 3 | 1 | 2 | 3 | 134 | 131 | 132 | 133 |

CONTROL TABLE FOR ORDINARY STATE

| | | | | | | | | | | |
|---|---|---|---|---|---|---|---|---|---|---|
| 41 | STATE | ORDINARY | | | | | | | | |
| 42 | RAID TYPE | RAID5 | | | | | | | | |
| 43 | NUMBER OF REDUNDANCY GROUPS | 5 | | | | | | | | |
| 44 | NUMBER OF PARTITIONS OF EACH REDUNDANCY GROUP | 4 | | | | | | | | |
| 45 | NUMBER OF TIMES OF ADDITION | 1 | | | | | | | | |

| CONFIGURATION MANAGEMENT | REDUNDANCY GROUP | DISK NO. | | | | PARTITION POSITION | | | | PARTITION NO. | | | |
|---|---|---|---|---|---|---|---|---|---|---|---|---|---|
| ORDINARY CONFIGURATION | 1ST | 24 | 21 | 22 | 23 | 0 | 1 | 2 | 3 | 101 | 102 | 103 | 104 |
| | 2ND | 24 | 22 | 23 | 20 | 1 | 2 | 3 | 1 | 111 | 112 | 113 | 114 |
| | 3RD | 24 | 23 | 20 | 21 | 2 | 3 | 1 | 2 | 121 | 122 | 123 | 124 |
| | 4TH | 24 | 20 | 21 | 22 | 3 | 1 | 2 | 3 | 131 | 132 | 133 | 134 |
| | 5TH | 20 | 21 | 22 | 23 | 0 | 0 | 0 | 0 | 141 | 142 | 143 | 140 |
| ADDITION-CAUSED CONFIGURATION | 1ST | | | | | | | | | | | | |
| | 2ND | | | | | | | | | | | | |
| | 3RD | | | | | | | | | | | | |
| | 4TH | | | | | | | | | | | | |
| | 5TH | | | | | | | | | | | | |

47 — ORDINARY CONFIGURATION
48 — ADDITION-CAUSED CONFIGURATION
49 — DISK NO.
50 — PARTITION POSITION
51 — PARTITION NO.
46 — (bracket over partition columns)

FIG.14

CONTROL TABLE FOR ORDINARY STATE

| | | | | | | | |
|---|---|---|---|---|---|---|---|
| 41 | STATE | | ORDINARY | | | | |
| 42 | RAID TYPE | | RAID5 | | | | |
| 43 | NUMBER OF REDUNDANCY GROUPS | | 5 | | | | |
| 44 | NUMBER OF PARTITIONS OF EACH REDUNDANCY GROUP | | 4 | | | | |
| 45 | NUMBER OF TIMES OF ADDITION | | 1 | | | | |

| CONFIGURATION MANAGEMENT | REDUNDANCY GROUP | DISK NO. (49) | | | | PARTITION POSITION (50) | | | | PARTITION NO. (51) | | | |
|---|---|---|---|---|---|---|---|---|---|---|---|---|---|
| ORDINARY CONFIGURATION (47) | 1ST | 24 | 21 | 22 | 23 | 0 | 1 | 2 | 3 | 104 | 101 | 102 | 103 |
| | 2ND | 24 | 22 | 23 | 20 | 1 | 2 | 3 | 0 | 114 | 111 | 112 | 113 |
| | 3RD | 24 | 23 | 20 | 21 | 2 | 3 | 0 | 1 | 124 | 121 | 122 | 123 |
| | 4TH | 24 | 20 | 21 | 22 | 3 | 0 | 1 | 2 | 134 | 131 | 132 | 133 |
| | 5TH | 20 | 21 | 22 | 23 | 0 | 1 | 2 | 3 | 140 | 141 | 142 | 143 |
| ADDITION-CAUSED CONFIGURATION (48) | 1ST | 24 | 25 | 22 | 23 | 0 | 1 | 2 | 3 | 104 | 105 | 102 | 103 |
| | 2ND | 24 | 25 | 23 | 20 | 2 | 2 | 3 | 0 | 114 | 115 | 112 | 113 |
| | 3RD | 24 | 25 | 20 | 21 | 2 | 3 | 0 | 1 | 124 | 125 | 122 | 123 |
| | 4TH | 24 | 21 | 22 | 23 | 2 | 0 | 1 | 2 | 134 | 135 | 132 | 133 |
| | 5TH | 20 | 21 | 22 | 23 | 0 | 1 | 2 | 3 | 140 | 141 | 142 | 143 |

CONTROL TABLE FOR ORDINARY STATE

| | | |
|---|---|---|
| STATE | ORDINARY | |
| RAID TYPE | RAID5 | |
| NUMBER OF REDUNDANCY GROUPS | 6 | |
| NUMBER OF PARTITIONS OF EACH REDUNDANCY GROUP | 4 | |
| NUMBER OF TIMES OF ADDITION | 1 | |

| CONFIGURATION MANAGEMENT | REDUNDANCY GROUP | DISK NO. | | | | PARTITION POSITION | | | | PARTITION NO. | | | |
|---|---|---|---|---|---|---|---|---|---|---|---|---|---|
| ORDINARY CONFIGURATION | 1ST | 24 | 24 | 22 | 23 | 0 | 1 | 2 | 3 | 104 | 105 | 102 | 103 |
| | 2ND | 24 | 25 | 23 | 20 | 1 | 2 | 2 | 3 | 114 | 115 | 112 | 113 |
| | 3RD | 24 | 25 | 20 | 21 | 2 | 3 | 2 | 3 | 124 | 125 | 122 | 123 |
| | 4TH | 24 | 25 | 21 | 22 | 3 | 0 | 2 | 3 | 134 | 135 | 132 | 133 |
| | 5TH | 20 | 21 | 22 | 23 | 0 | 0 | 0 | 0 | 140 | 141 | 142 | 143 |
| | 6TH | 20 | 21 | 22 | 23 | 1 | 1 | 1 | 1 | 150 | 151 | 152 | 153 |
| ADDITION-CAUSED CONFIGURATION | 1ST | | | | | | | | | | | | |
| | 2ND | | | | | | | | | | | | |
| | 3RD | | | | | | | | | | | | |
| | 4TH | | | | | | | | | | | | |
| | 5TH | | | | | | | | | | | | |
| | 6TH | | | | | | | | | | | | |

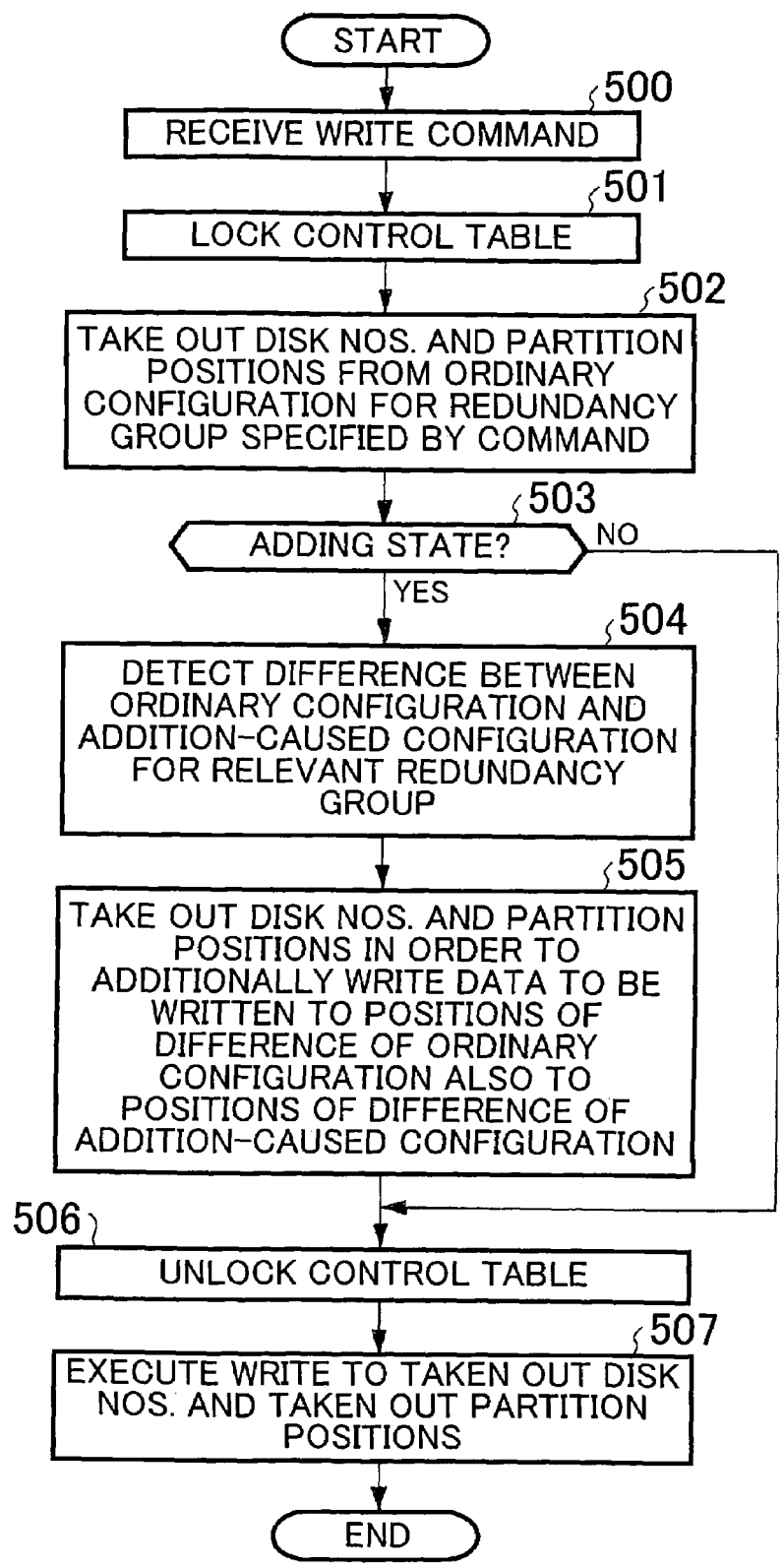

DISK ARRAY DEVICE, METHOD OF EXTENDING STORAGE CAPACITY AND COMPUTER PROGRAM

BACKGROUND OF THE INVENTION

1. Field of the Invention

This invention relates to a disk array device and a method of extending the storage capacity of the disk array device. More particularly, it relates to a disk array device adapted to extend the storage capacity thereof by adding disks, while maintaining the RAID type of the disk array and a method of extending the storage capacity of such a disk array device.

2. Related Background Art

A disk array is an arrangement of a plurality of disk devices in order to enhance the performance and the reliability of a disk system and, at the same time, realize a large storage capacity at reduced cost. Six categories of RAID (redundant array of inexpensive disks) 1 through 6 are known, although each of them have advantages and disadvantages so that they are selectively used depending on applications. For instance, RAID5 is designed to distribute parities to a plurality of disks on a stripe by stripe basis in order to avoid the disadvantage of RAID4 that the redundancy disks for parities is a bottle neck. It is conveniently used for transaction processing systems. However, RAID5 has several types that are defined by the number of disk devices that constitute a redundancy group. In this letter of specification, each type of RAID 5 is indicated by annexing (iD+P) to RAID5 as conventional expression of the technological field of disk arrays, where i represents a positive integer not smaller than 2 and D represents a data disk, while P represents a parity disk. However, it should be noted that parities are distributed among a plurality of disk devices for RAID5 as described above so that there is no disk device dedicated to parities.

While one of the advantages of a disk array is its large storage capacity, the volume of data to be stored is ever increasing so that the storage capacity of a disk array being operated may have to be extended from time to time. Three techniques as listed below are known to extend the storage capacity of a disk array of RAID5 by adding a disk device.

Known Technique (1)

All the data stored in the disk array of RAID5 that is being operated are temporarily saved in a magnetic tape or the like and the RAID configuration of the disk array is altered so as to match the added disk device before all the saved data are restored. For example, when a disk device is added to a disk array of RAID5 (3D+1P) comprising four disk devices, all the data in the disk array of RAID5 (3D+1P) are temporarily saved in a magnetic tape and the disk array is reconfigured to realize RAID5 (4D+1P). Then, all the saved data are restored.

Known Technique (2)

The parity group is reconfigured and the parities are recomputed while the existing data stored in the disk array of RAID5 that are being operated are moved to the added disk device (see, JP 8-115173 A). For example, when a disk device is added to a disk array of RAID5 (3D+1P), the disk array is reconfigured to realize RAID5 (4D+1P). For the feature of extending RAID5 (3D+P) to RAID5 (4D+P), see "RAID Subsystem G Series (Desktop Model, 19" Rack Model) Handling Manual", P/NA207750, Revision 4.4. A summary of the extension feature is also described on the Internet at <URL: http://www.adtx.com/product/manuals/subsystem/axrs-g/1_rsr-gxs_usr44_7750.pdf>, page 13.

Known Technique (3)

This technique is an improvement to the known technique (2) and designed to eliminate the task of recalculating the parities of RAID by incorporating the added disk device after writing nil data in the entire storage region of the added disk device (see, JP 2000-10738 A).

While several techniques have been put to use to extend the storage capacity by adding a disk device to the disk array being operated, the RAID configuration of the disk array is altered each time a disk device is added by using any of the known techniques. For instance, when the initial RAID configuration is RAID5 (3D+P), it is altered to RAID5 (4D+P) when a disk device is added and to RAID5 (5D+P) when two disk devices are added with any of the known techniques (1) through (3).

Generally speaking, the reliability of RAID5 (3D+P), that of RAID5 (4D+P) and that of RAID5 (5D+P) are equal from the viewpoint of capability of degeneration to a single unit. However, the probability of forced degenerative operation is higher at RAID5 (4D+P) than at RAID5 (3D+P) and higher at RAID5 (5D+P) than at RAID5 (4D+P). Differently stated, the larger the value of i in RAID5 (iD+P), the higher the probability of forced degenerative operation. This is because the probability of producing a faulty disk device increases as the number of disk devices that constitute a redundancy group increases. Additionally, as the value of i increases, the number of disk devices that are to be accessed in parallel during a degenerative operation increases to raise the processing overhead. On the other hand, the efficiency of utilization of data falls as the value of i decreases. For this reason, an optimum value is selected for i by referring to the designed applications when a disk array is prepared initially. However, there arises a problem that the initial configuration of RAID cannot be maintained when the storage capacity of a disk array is extended by means any of the known techniques.

Additionally, with the known technique (3), the parities are not distributed among all the disks at the time of adding a disk device so that a perfect RAID5 configuration is not realized to consequently reduce the data protection capability of the disk array.

SUMMARY OF THE INVENTION

In view of the above identified circumstances, it is therefore an object of the present invention to provide a disk array device and a method of extending the storage capacity of the disk array device that make it possible to extend the storage capacity of the disk array by adding a disk device, while maintaining the initial RAID configuration.

Another object of the present invention is to provide a disk array device and a method of extending the storage capacity of the disk array device that can extend the storage capacity of the disk array by adding a disk device without reducing the data protection capability of the disk array.

Still another object of the present invention is to provide a disk array device and a method of extending the storage capacity of the disk array device that can double the data protection capability by extending the storage capacity of the disk array to a double of the original storage capacity.

According to a fist aspect of the present invention, there is provided a disk array device having a plurality of disks, each of said disks being divided into a plurality of partitions, and a plurality of redundancy groups, each of said redundancy groups having a plurality of partitions, each of said partitions of each of said redundancy groups belonging to a disk different from the disks the other partitions of the same redundancy group belong to, said disk array device comprising: means for dividing a newly added disk into a plurality of partitions; means for selecting, as an origin of copying a partition, a partition included in one of the existing redundancy groups but not sharing a disk with any other origin of copying a partition of any other existing redundancy group; means for selecting a partition of said newly added disk as a destination of copying a partition; means for repeating copying the data of an origin of copying a partition to a destination of copying a partition for a plurality of existing redundancy groups; means for excluding the origin of copying partitions from the existing redundancy groups said origin of copying partitions have belonged to and adding the destination of copying partitions to the redundancy groups the origin of copying partitions have belonged to; and means for preparing a new redundancy group by collecting the excluded plurality of partitions.

According to a second aspect of the present invention, there is provided a disk array device having a disk array controller for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to: said disk array controller being adapted to select N partitions from said N redundancy groups, each of N partitions being selected from each of said N redundancy groups, said N partitions being selected from different initial disk devices, so as to define the selected N partitions as origin of copying partitions and define the N partitions of a first added disk device formed by equally dividing the storage region thereof by N as destination of copying partitions; said controller having: a copying processing section for copying the data stored in the origin of copying partitions to the destination of copying partitions; and a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

In device according to the second aspect, said copying processing section may select N different partitions from the initial disk devices other than said new redundancy group generated as a result of extending the storage capacity, each of N partitions being selected from each of the N redundancy groups, so as to define the selected N partitions as origin of copying partitions and may define the N partitions of a second added disk device formed by equally dividing the storage region thereof by N as destination of copying partitions so as to copy the data stored in the origin of copying partitions to the destination of copying partitions and, at the time of completion of the copying, said redundancy group defining section may exclude the origin of copying partitions from the original redundancy groups so as to incorporate the corresponding destination of copying partitions respectively into the original redundancy groups and may combine the N origin of copying partitions excluded from the original redundancy groups to generate a new redundancy group.

In the device according to the second aspect, said copying processing section may repeat the processing operation of extending the storage capacity up to the N-th added disk device and may extend the storage capacity of the disk array so as to include the N redundancy groups generated on the N initial disk devices and the N redundancy groups generated on the N added disk devices.

In the device according to the second aspect, said disk array controller may be so configured as to have said copying processing section execute said processing operation of copying the data stored in the origin of copying partitions to the destination of copying partitions in the background while the disk array is being operated and further includes an IO processing section for writing the data to be written to the origin of copying partitions and to the destination of copying partitions when a write command is issued to the disk array from a host computer.

In the device according to the second aspect, said predetermined RAID type may be RAID5 (iD+P), where i is a positive integer not smaller than 2.

According to a third aspect of the present invention, there is provided a disk array device having a disk array controller for providing a disk array of a predetermined RAID type and the smallest number N of initial disk devices required for said RAID type and including M sets of N redundancy groups, where M is a positive integer, each of said M times of N redundancy groups having M sets of N partitions formed by equally dividing the storage region of each of said initial disk devices by M×N, each of said partitions of each of said redundancy groups belonging to a disk different from the disks the other partitions of the same redundancy group belong to: said disk array controller being adapted to select M×N partitions from said N redundancy groups of M sets, each of M×N partitions being selected from each of said N redundancy groups, said M×N partitions being selected from different initial disk devices, so as to define the selected M×N partitions as origin of copying partitions and define the M×N partitions of a first added disk device formed by equally dividing the storage region thereof by M×N as destination of copying partitions; said controller having: a copying processing section for copying the data stored in the origin of copying partitions to the destination of copying partitions; and a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

In the device according to the third aspect, said copying processing section may select M×N different partitions from the initial disk devices other than said new redundancy group generated as a result of extending the storage capacity, each of M×N partitions being selected from the N redundancy groups of each of the M sets, so as to define the selected M×N partitions as origin of copying partitions and may define the M×N partitions of a second added disk device formed by equally dividing the storage region thereof by M×N as destination of copying partitions so as to copy the data stored in the origin of copying partitions to the destination of copying partitions and, at the time of completion of the copying, said redundancy group defining section may exclude the origin of copying partitions from the original redundancy groups so as to incorporate the corresponding destination of copying partitions respectively into the original redundancy groups and may combine the N origin of copying partitions excluded from the original redundancy groups to generate new a redundancy groups.

In the device according to the third aspect, said copying processing section may repeat the processing operation of extending the storage capacity up to the N-th added disk device and may extend the storage capacity of the disk array so as to include the M×N redundancy groups generated on the N initial disk devices and the M×N redundancy groups generated on the N added disk devices.

In the device according to the third aspect, said disk array controller may be so configured as to have said copying processing section execute said processing operation of copying the data stored in the origin of copying partitions to the destination of copying partitions in the background while the disk array is being operated and may further include an IO processing section for writing the data to be written to the origin of copying partitions and to the destination of copying partitions when a write command is issued to the disk array from a host computer.

In the device according to the third aspect, said predetermined RAID type may be RAID5 (iD+P), where i is a positive integer not smaller than 2.

According to a fourth aspect of the present invention, there is provided a disk array device having a disk array controller for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to: said disk array controller being adapted to select, each time an additional disk device is added, N partitions from the N redundancy groups other than the new redundancy group generated as a result of the extension of the storage capacity, each of N partitions being selected from each of said N redundancy groups, said N partitions being selected from different initial disk devices, so as to define the selected N partitions as origin of copying partitions and define said N partitions of said added disk device as destination of copying partitions; said controller having: a copying processing section for copying the data stored in the origin of copying partitions to the destination of copying partitions; and a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

In the device according to the fourth aspect, said copying processing section may add disk devices up to N-th additional disk device and may extend the storage capacity of the disk array to include the N redundancy groups generated on the N initial disk devices and the N redundancy groups generated on the N added disk devices.

In the device according to the fourth aspect, said disk array controller may be so configured as to have said copying processing section execute said processing operation of copying the data stored in the origin of copying partitions to the destination of copying partitions in the background while the disk array is being operated and may further include an IO processing section for writing the data to be written to the origin of copying partitions and to the destination of copying partitions when a write command is issued to the disk array from a host computer.

In the device according to the fourth aspect, said predetermined RAID type may be RAID5 (iD+P), where i is a positive integer not smaller than 2.

According to a fifth aspect of the present invention, there is provided a disk array device having a disk array controller for providing a disk array of a predetermined RAID type and the smallest number N of initial disk devices required for said RAID type and including M sets of N redundancy groups, where M is a positive integer, each of said N redundancy groups having M sets of N partitions formed by equally dividing the storage region of each of said initial disk devices by M×N, each of said partitions of each of said redundancy groups belonging to a disk different from the disks the other partitions of the same redundancy group belong to: said disk array controller being adapted to select, each time an additional disk device is added, M×N partitions from the N redundancy groups of M sets other than the new redundancy group generated as a result of the extension of the storage capacity, each of M×N partitions being selected from each of said N redundancy groups, said M×N partitions being selected from different initial disk devices, so as to define the selected M×N partitions as origin of copying partitions and define said M×N partitions of said added disk device as destination of copying partitions; said controller having: a copying processing section for copying the data stored in the origin of copying partitions to the destination of copying partitions; and a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

In the device according to the fifth aspect, said disk array controller may add disk devices up to N-th additional disk device and may extend the storage capacity of the disk array to include the M×N redundancy groups generated on the N initial disk devices and the M×N redundancy groups generated on the N added disk devices.

In the device according to the fifth aspect, said disk array controller may be so configured as to have said copying processing section execute said processing operation of copying the data stored in the origin of copying partitions to the destination of copying partitions in the background while the disk array is being operated and may farther include an IO processing section for writing the data to be written to the origin of copying partitions and to the destination of copying partitions when a write command is issued to the disk array from a host computer.

In the device according to the fifth aspect, said predetermined RAID type may be RAID5 (iD+P), where i is a positive integer not smaller than 2.

According to a sixth aspect of the present invention, there is provided a disk array device comprising a disk array controller connected to a host computer and a plurality of disk devices connected to the disk array controller to provide a disk array of a predetermined RAID type: said disk array controller having an IO processing section for processing an IO command from said host computer, a copying processing section for copying data to accommodate an addition of a disk, a redundancy group defining section for defining redundancy groups, a disk control section for controlling said disk devices, a control table for storing configuration information and other pieces of information of the disk array, a read position browsing section, a write position browsing section and a copying position browsing section; said control table having a configuration of storing a state flag indicating the state of said disk array of an addition of a disk in progress or not, the number of times of addition of a disk device, ordinary configuration information and addition-caused configuration information, said ordinary configuration information being so initialized as to contain disk partition information indicating the disk device each of the partitions of each redundancy group belonging to, said disk array being so generated as to have the smallest number N of initial disk devices required for said RAID type and include N redundancy groups, each of said N redundancy groups having N partitions formed by equally dividing the storage region of each of said initial disk devices by N, each of said partitions of each of said redundancy groups belonging to a disk different from the disks the other partitions of the redundancy group belong to; at the time of extending the storage capacity of said disk array by adding an additional disk device having N partitions, each being formed by equally dividing the storage region thereof by N, said copying processing section being adapted to select N different partitions from the initial disk devices other than said new redundancy group generated as a result of extending the storage capacity, each of N partitions being selected from each of the N redundancy groups, according to the number of times of addition up to now and the ordinary configuration information in said control table, define configuration information obtained by replacing the information on the selected N partitions in said ordinary configuration information by information on the corresponding partitions of said added disk device as addition-caused configuration information in said control table, detect the difference between said ordinary configuration information and said addition-caused configuration information for each of said N redundancy groups by means of said copying position browsing section so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate a new redundancy group by means of said redundancy group defining section; upon receiving a read command for said disk array from said host computer, said IO processing section determining the disk device and partition for reading data from the ordinary configuration information in the control table by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring from the ordinary configuration information in the control table disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

According to the device according to the sixth aspect, said disk array controller may further have an exclusivity control section and, when said control table is referred to and updated, said copying processing section and said IO processing section may lock said control table by means of said exclusivity control section.

According to the device according to the sixth aspect, said predetermined RAID type may be RAID5 (iD+P), where i is a positive integer not smaller than 2.

According to a seventh aspect of the present invention, there is provided a disk array device comprising a disk array controller connected to a host computer and a plurality of disk devices connected to the disk array controller to provide a disk array of a predetermined RAID type: said disk array controller having an IO processing section for processing an IO command from said host computer, a copying processing section for copying data to accommodate an addition of a disk, a redundancy group defining section for defining redundancy groups, a disk control section for controlling said disk devices, a control table for storing configuration information and other pieces of information of the disk array, a read position browsing section, a write position browsing section and a copying position browsing section; said control table having a configuration of storing a state flag indicating the state of said disk array of an addition of a disk in progress or not, the number of times of addition of a disk device, ordinary configuration information and addition-caused configuration information, said ordinary configuration information being so initialized as to contain disk partition information indicating the disk device each of the partitions of each redundancy group belonging to, said disk array being so generated as to have the smallest number N of initial disk devices required for said RAID type and include N redundancy groups, each of said N redundancy groups having M sets of N partitions, where M is a positive integer, formed by equally dividing the storage region of each of said initial disk devices by M×N, each of said partitions of each of said redundancy groups belonging to a disk different from the disks the other partitions of the redundancy group belong to; at the time of extending the storage region of said disk array by adding an additional disk device having M×N. partitions, each being formed by equally dividing the storage region thereof by M×N, said copying processing section being adapted to select N different partitions for each of said M sets from the initial disk devices other than said new redundancy group generated as a result of extending the storage capacity, each of M×N partitions being selected from each of the N redundancy group, according to the number of times of addition up to now and the ordinary configuration information in said control table, define configuration information obtained by replacing the information on the selected M×N partitions in said ordinary configuration information by information on the corresponding partitions of said added disk device as addition-caused configuration information in said control table, detect the difference between said ordinary configuration information and said addition-caused configuration information for each of said N redundancy groups of each of said M sets by means of said copying position browsing section so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate new a redundancy groups by means of said redundancy group defining section; upon receiving a read command for said disk array from said host computer, said IO processing section determining the disk device and partition for reading data from the ordinary configuration information in the control table by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

According to the device according to the seventh aspect, said disk array controller may further have an exclusivity control section and, when said control table is referred to and updated, said copying processing section and said IO processing section may lock said control table by means of said exclusivity control section.

In the device according to the seventh aspect, said predetermined RAID type may be RAID5 (iD+P), where i is a positive integer not smaller than 2.

According to the invention, it is possible to extend the storage capacity of a disk array having N disk devices by adding a disk device by the storage capacity of the added disk device, while maintaining the initial RAID configuration.

According to the invention, it is possible to extend the storage capacity of a disk array having N disk devices by adding another disk device by the storage capacity of the two added disk devices, while maintaining the initial RAID configuration.

According to the invention, it is possible to extend the storage capacity of a disk array by adding N disk devices by the storage capacity of the added N disk devices, while maintaining the initial RAID configuration, and both the initial N disk devices and the added N disk devices can be degenerated to a single unit to make it possible to degenerate all the disk devices to two units and hence double the original data protection capability because the N redundancy groups generated on the initial N disk devices and the N redundancy groups generated on the added N disk devices are based on different disk devices.

According to the invention, it is possible to extend the storage capacity of a disk array while it is being operated.

According to the invention, it is possible to extend the storage capacity of a disk array by adding disk devices on a one by one basis by the storage capacity of all the added disk devices, while maintaining the initial RAID configuration, and if N disk devices are added, both the initial N disk devices and the added N disk devices can be degenerated to a single unit to make it possible to degenerate all the disk devices to two units and hence double both the storage capacity and the original data protection capability because the N redundancy groups generated on the initial N disk devices and the N redundancy groups generated on the added N disk devices are based on different disk devices.

According to the invention, it is possible to prohibit reference to the control table that is being updated in a competition of a copying process of a copying processing section and an IO process of an IO processing section.

According to the invention, it is possible to extend the storage capacity of a disk array of RAID5 (iD+P) (i being a positive integer not smaller than 2), while maintaining the initial RAID configuration.

BRIEF DESCRIPTION OF THE DRAWINGS

FIG. 10 is a schematic illustration of exemplary contents of the control table that corresponds to a disk array of RAID5 (3D+P) in an initial state that is configured by a minimum number of devices;

FIG. 12 is a schematic illustration of exemplary contents of the control table in a state where a disk device is added to a disk array of RAID5 (3D+P) in an initial state in order to extend the storage capacity thereof;

FIG. 13 is a schematic illustration of exemplary contents of the control table that corresponds to a disk array of RAID5 (3D+P) in an initial state to which a disk device is added in order to extend the storage capacity thereof;

FIG. 14 is a schematic illustration of exemplary contents of the control table in a state where another disk device is further added to a disk array of RAID5 (3D+P), to which a disk device has already been added, in order to extend the storage capacity thereof;

FIG. 15 is a schematic illustration of exemplary contents of the control table that corresponds to a disk array of RAID5 (3D+P) in an initial state to which two disk devices are added in order to extend the storage capacity;

FIG. 17 is a flow chart of a write command processing operation of the disk array device of Example 1 of the first embodiment.

DETAILED DESCRIPTION OF THE PREFERRED EMBODIMENTS

Now, the present invention will be described in greater detail by referring to the accompanying drawings that illustrate preferred embodiments of the invention.

[1st Embodiment]

Figure 1:
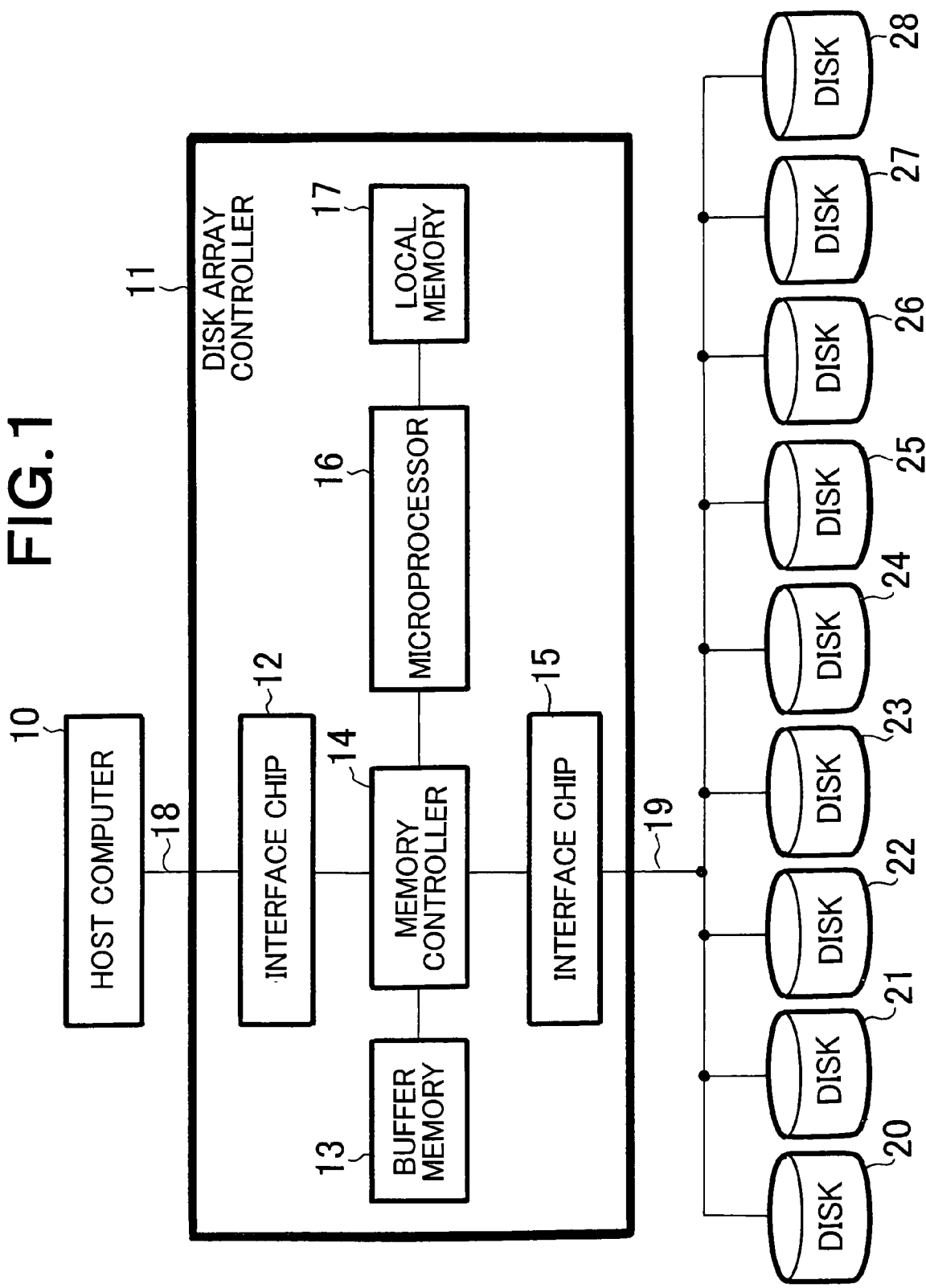
FIG. 1 is a schematic block diagram of the first embodiment of disk array device according to the invention.

Referring to FIG. 1, the first embodiment of disk array device according to the invention is a disk array device of a predetermined RAID type comprising a disk array controller 11 connected to a host computer 10 by way of a general purpose bus 18 such as a fiber channel and a plurality of disk devices 20 through 28 connected to the disk array controller 11 also by way of a general purpose bus 19 such as a fiber channel and adapted to use the plurality of disk devices 20 through 28. Note that all the disk devices 20 through 28 have a same storage capacity.

The disk array controller 11 typically has a hardware configuration as illustrated in the corresponding block of FIG. 1. Interface chip 12 is an interface for connecting the disk array controller 11 to the host computer 10 by way of the general purpose bus 18 and interface chip 15 is an interface for connecting the disk array controller 11 to the plurality of disk devices 20 through 28 by way of the general purpose bus 19. Arranged between the interface chips 12, 15 are a buffer memory 13 for storing read data and write data, a memory controller 14 for controlling the buffer memory 13, a microprocessor 16 for comprehensively controlling them and a local memory 17 for storing microcodes and various pieces of control information.

An operation as described below is carried out when the host computer 10 reads data from the disk array. The host computer 10 transmits a read command to the interface chip 12 by way of the general purpose bus 18 and the interface chip 12 transfers it to the microprocessor 16 by way of the memory controller 14. The microprocessor 16 issues a read command to an appropriate disk device by way of the memory controller 14 and the interface chip 15 and at the same time it specifies the address in the buffer memory 13 to which the related read data is to be transferred to the interface chip 15. The disk device that receives the read command transmits the read data to the interface chip 15, which by turn transfers the data to the specified address in the buffer memory 13 and notifies the microprocessor 16 of completion of the data transfer. The microprocessor 16 direct the interface chip 12 for data transfer so as to transfer the read data from the buffer memory 13 to the host computer 10 by way of the memory controller 14 and the interface chip 12, which interface chip 12 by turn notifies the microprocessor 16 of completion of the data transfer. Finally, the microprocessor 16 reports completion of the read command to the host computer 10 by way of the interface chip 12.

An operation as described below is carried out when the host computer 10 writes data stored in the disk array. The host computer 10 transmits a write command to the interface chip 12 by way of the general purpose bus 18 and the interface chip 12 transfers it to the microprocessor 16 by way of the memory controller 14. The microprocessor 16 designates the interface chip 12 for data transfer so as to transfer the write data from the host computer 10 to the buffer memory 13 by way of the interface chip 12 and the memory controller 14 and the interface chip 12 notifies the microprocessor 16 of completion of the data transfer. The microprocessor 16 issues a write command to an appropriate disk device by way of the memory controller 14 and the interface chip 15 and at the same time it specifies the address in the buffer memory 13 from which the related write data is to be transferred to the interface chip 15. The disk device that receives the write command requests the write data to the interface chip 15, which transfers the data from the specified address in the buffer memory 13 and notifies the microprocessor 16 of completion of the data transfer. Finally, the microprocessor 16 reports completion of the write command to the host computer 10 by way of the interface chip 12.

The hardware configuration of the disk array controller 11 is not limited to the illustrated one, which may be modified or altered in various different ways.

The disk array device of this embodiment, which is of a predetermined RAID type, is initially generated by using the necessary smallest number of disk devices and, after starting operation, allows addition of disk devices to appropriately extend the storage capacity of the disk array, while maintaining the initial RAID type. Now, the operation of this embodiment will be described below mainly in terms of the process of extending the storage capacity of the disk array.

Firstly, the initially generated disk array will be described. For this embodiment, disk devices of the smallest number N required for the RAID type are used and the storage region of each of the disk devices is equally divided into N regions, each of which is defined as a partition. Thus, a disk array is initially generated so as to include N redundancy groups formed by combining N partitions of the N different disk devices. The N disk devices that are used for the initial generation are referred to as "initial disk devices" in order to discriminate them from the disk devices that are added subsequently.

Figure 2:
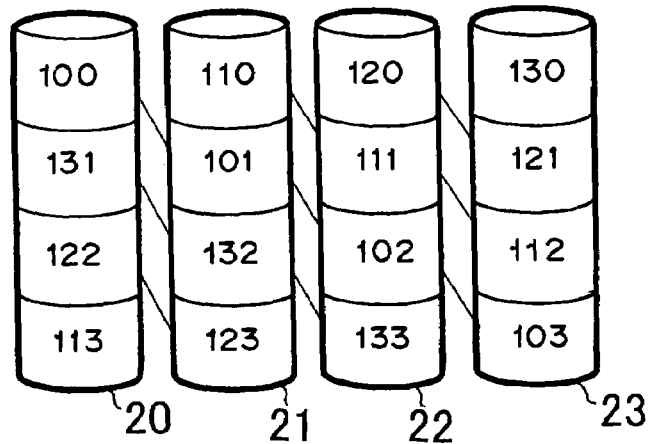
FIG. 2 is a schematic illustration of the configuration of a disk array of RAID5 (3D+P) in an initial state of being configured by a minimum number of devices.

For example, assume here that the predetermined RAID type is RAID5 (3D+P). Then, the smallest number N of disk devices required for the type is four. Therefore, as shown in FIG. 2, four disk devices 20 through 23 are used as initial disk devices and the storage region of each of the disk devices 20 through 23 is divided into four equal regions, each of which is defined as a partition. Therefore, if the storage capacity of each of the disk devices 20 through 23 is 80 MB, a partition has a storage capacity of 20 MB. Then, N redundancy groups are formed by combining N partitions of the N different disk devices for each redundancy group. To do this, for example, the uppermost partition 100 of the disk device 20, the second highest partition 101 of the disk device 21, the third highest partition 102 of the disk device 22 and the fourth highest partition 103 of the disk device 23 may be combined to produce a first redundancy group of four partitions that are arranged aslant as shown in FIG. 2. Then, similarly, the partitions 110, 111, 112 and 113 may be combined to produce a second redundancy group and the partitions 120, 121, 122 and 123 may be combined to produce a third redundancy group, while the partitions 130, 131, 132 and 133 may be combined to produce a fourth redundancy group.

The disk array generated initially in a manner as described above is driven to start operation of the system. For example, since the disk array of RAID5 (3D+P) in an initial state of FIG. 2 has a total of four redundancy groups including the first through fourth redundancy groups, the four partitions of each of the redundancy groups is divided into stripes having a predetermined width and parities are distributed among the four disk devices 20 through 23 on a stripe by stripe basis.

As the system operation is continued, there may arise an occasion where the storage capacity of the disk array needs to be extended. Then, a disk device is added to the disk array to extend the storage capacity. Firstly, the storage region of the added disk device is equally divided into N regions, each of which is defined as a partition as in the case of the initial disk devices. Then, different partitions of the initial disk devices are selected respectively from the N redundancy groups of the disk array that is being operated and the selected N partitions are defined as origin of copying partitions while the N partitions of the added disk device are defined as destination of copying partitions. Then, the data stored in the origin of copying partitions are copied to the destination of copying partitions. Subsequently, when the copying operation is completed, the origin of copying partitions are excluded from the original redundancy groups and the corresponding destination of copying partitions are incorporated to replace the excluded origin of copying partitions, while the origin of copying partitions that are excluded from the original redundancy groups and include N partitions are recombined to generate a new redundancy group.

For example, assume that a disk device 24 is added to the disk array of RAID5 (3D+P) in an initial state as shown in FIG. 2 to extend the storage capacity thereof The storage region of the added disk device 24 is equally divided by four to define four partitions as in the case of the initial disk devices 20 through 23 and different partitions are respectively selected from four redundancy groups of the initial disk devices of the disk array that is being operated. Then, the selected four partitions are defined as origin of copying partitions and the four partitions of the added disk device 24 are defined as destination of copying partitions so that the data stored in the origin of copying partitions are copied to the destination of copying partitions.

Figure 3:
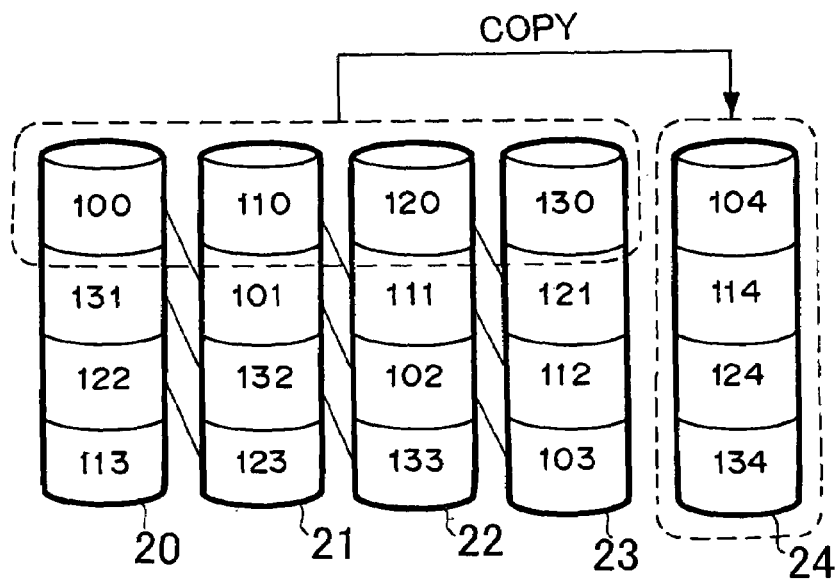
FIG. 3 is a schematic illustration of the process of extending the storage capacity of a disk array of RAID5 (3D+P) in an initial state by adding a disk device.

When partitions that are arranged aslant are combined to form each redundancy group as shown in FIG. 2, a technique of selecting the leading partitions 100, 110, 120 and 130 of the disk devices 20 through 23 as shown in FIG. 3 may be used for the purpose of selecting different partitions of the initial disk devices from the four redundancy groups of the disk array that is being operated. When this technique is used, the data stored in the uppermost partition 100 of the disk device 20 is copied to the partition 104 of the disk device 24 and the data stored in the uppermost partition 110 of the disk device 21 is copied to the partition 114 of the disk device 24, whereas the data stored in the uppermost partition 120 of the disk device 22 is copied to the partition 124 of the disk device 24 and the data stored in the uppermost partition 130 of the disk device 23 is copied to the partition 134 of the disk device 24.

These copying operations are carried out by reading the data of the partitions 100, 110, 120 and 130, which are origin of copying partitions, of the disk devices 20 through 23 to the buffer memory 13 and writing the data in the buffer memory 13 to the partitions 104, 114, 124 and 134, which are destination of copying partitions, of the disk device 24. Since the destinations of copying partitions are incorporated into the original redundancy groups to replace the excluded origin of copying partitions, it is not necessary to recomputed the parities. In other words, it is only necessary to copy the data of the origin of copying partitions to the destination of copying partitions.

When the copying operation is completed, the origin of copying partitions 100, 110, 120 and 130 are excluded from the first through fourth original redundancy groups and the corresponding destination of copying partitions 104, 114, 124 and 134 are incorporated into the first through fourth original redundancy groups to replace the excluded origin of copying partitions, while the four origin of copying partitions 100, 110, 120 and 130 that are excluded from the original redundancy groups are recombined to generate a new redundancy group. As a result, the disk array of FIG. 2 is reconfigured to the disk array of FIG. 4 and the storage capacity of the disk array is increased by the storage capacity of the added disk device 24.

After the extension, the disk array has a first redundancy group constituted by the partitions 104, 101, 102 and 103, a second redundancy group constituted by the partitions 114, 111, 112 and 113, a third redundancy group constituted by the partitions 124, 121, 122 and 123, a fourth redundancy group constituted by the partitions 134, 131, 132 and 133 and a fifth redundancy group constituted by the partitions 144, 141, 142 and 143. The fifth redundancy group is the redundancy group that is newly generated by redefining the partitions 100, 110, 120 and 130 that are excluded from the original first through fourth redundancy groups. All the redundancy groups are constituted by four partitions to maintain RAID5 (3D+P).

When the storage capacity of the disk array is extended further by adding another disk device, a processing operation basically similar to the one that is carried out when the first disk device is added is also carried out. Firstly, the storage region of the added second disk device is equally divided into N regions, each of which is defined as a partition as in the case of the added first disk devices. Then, different partitions of the initial disk devices are selected respectively from the N redundancy groups of the disk array that is being operated, the new redundancy group generated at the time of adding the first disk device being excepted, and the selected N partitions are defined as origin of copying partitions while the N partitions of the added second disk device are defined as destination of copying partitions. Then, the data stored in the origin of copying partitions are copied to the destination of copying partitions. Subsequently, when the copying operation is completed, the origin of copying partitions are excluded from the original redundancy groups and the corresponding destination of copying partitions are incorporated to replace the excluded origin of copying partitions, while the origin of copying partitions that are excluded from the original redundancy groups and include N partitions are recombined to generate a new redundancy group.

Figure 4:
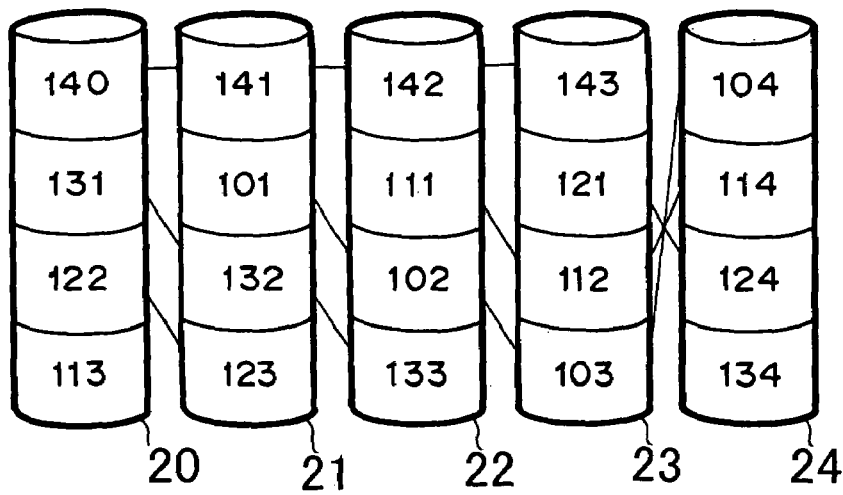
FIG. 4 is a schematic illustration of the configuration of a disk array of RAID5 (3D+P) in an initial state whose storage capacity is extended by adding a disk device.
Figure 5:
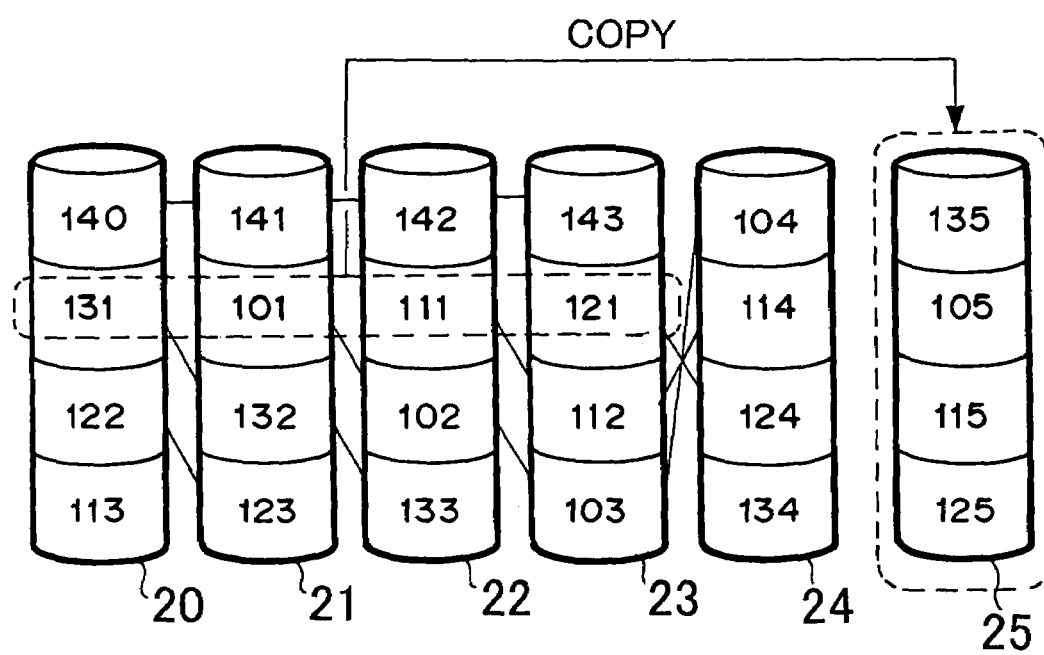
FIG. 5 is a schematic illustration of the process of extending the storage capacity of a disk array of RAID5 (3D+P), to which a disk device has been added, by further adding another disk device.
Figure 6:
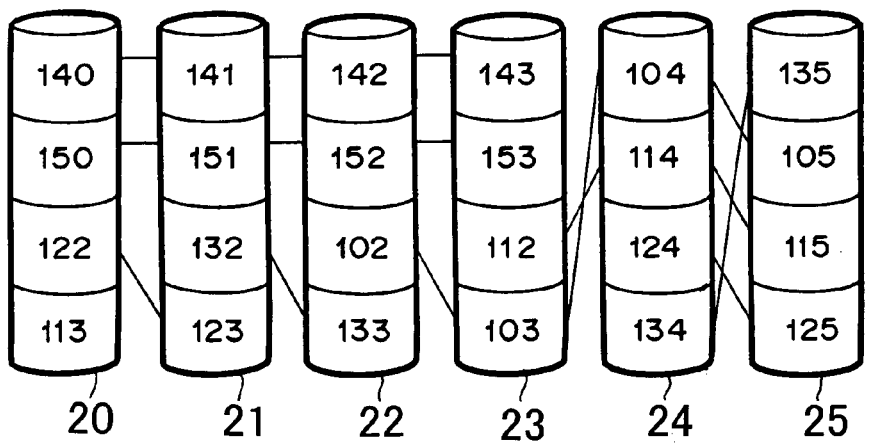
FIG. 6 is a schematic illustration of the configuration of a disk array of RAID5 (3D+P) in an initial state whose storage capacity is extended by adding two disk devices.

For example, assume that a disk device 25 is further added to the disk array of RAID5 (3D+P) as shown in FIG. 4 to extend the storage capacity thereof. The storage region of the added disk device 25 is equally divided by four to define four partitions as in the case of the initial disk devices 20 through 23 and different partitions are respectively selected from the four redundancy groups of the initial disk devices of the disk array that is being operated, the fifth redundancy group that is generated at the time of adding the first disk device being excepted. Then, the selected four partitions are defined as origin of copying partitions and the four partitions of the added disk device 25 are defined as destination of copying partitions so that the data stored in the origin of copying partitions are copied to the destination of copying partitions. When different partitions are selected respectively from the four redundancy groups including the first through fourth redundancy groups of the initial disk devices 20 through 23, a technique of selecting the second partitions 131, 101, 111 and 121 of the disk devices 20 through 23 as shown in FIG. 5 may be used. When this technique is used, the data stored in the second partition 131 of the disk device 20 is copied to the partition 135 of the disk device 25 and the data stored in the second partition 101 of the disk device 21 is copied to the partition 105 of the disk device 25, whereas the data stored in the second partition 111 of the disk device 22 is copied to the partition 115 of the disk device 25 and the data stored in the second partition 121 of the disk device 23 is copied to the partition 125 of the disk device 25. When the copying operation is completed, the origin of copying partitions 131, 101, 111 and 121 are excluded from the first through fourth original redundancy groups and the corresponding destination of copying partitions 135, 105, 115 and 125 are incorporated into the first through fourth original redundancy groups to replace the excluded origin of copying partitions, while the four origin of copying partitions 131, 101, 111 and 121 that are excluded from the original redundancy groups are recombined to generate a new redundancy group. As a result, the disk array of FIG. 4 is reconfigured to the disk array of FIG. 6 and the storage capacity of the disk array is further increased by the storage capacity of the added disk device 25.

After the extension, the disk array has a first redundancy group constituted by the partitions 104, 105, 102 and 103, a second redundancy group constituted by the partitions 114, 115, 112 and 113, a third redundancy group constituted by the partitions 124, 125, 122 and 123, a fourth redundancy group constituted by the partitions 134, 135, 132 and 133, a fifth redundancy group constituted by the partitions 140, 141, 142 and 143 and a sixth redundancy group constituted by the partitions 150, 151, 152 and 153. The sixth redundancy group is the redundancy group that is newly generated by redefining the partitions 131, 101, 111 and 121 that are excluded from the original first through fourth redundancy groups. All the redundancy groups are constituted by four partitions to maintain RAID5 (3D+P).

When the storage capacity of the disk array is extended further by adding disk devices 26 and 27, a processing operation basically similar to the one that is carried out when the disk device 25 is added is also carried out. More specifically, the data of the third partitions of the disk devices 20, 21, 22 and 23 are copied to the disk device 26 and the data of the fourth partitions of the disk devices 20, 21, 22 and 23 are copied to the disk device 27 to redefine the partitions that constitute the first through fourth redundancy groups and, at the same time, the seventh redundancy group of the partitions 160, 161, 162 and 163 and the eighth redundancy group of the partitions 170, 171, 172 and 173 are defined at the respective original positions.

Thus, this embodiment of disk array device according to the invention provides an advantage that disk devices can be added to extend the storage capacity of the disk array without changing the initial RAID type of the disk array. The embodiment of disk array device according to the invention provides further advantages as listed below.

(A) It is possible to extend the storage capacity by adding a disk while the disk array device is being operated.

(B) It is not necessary to recognize the progress of the data copying operation that arises as a result of adding a disk during an IO process (an operation of processing a read command and processing a write command) on the disk array that is directed by the host computer 10.

(C) The RAID configuration is divided into two independent RAID configurations to double the reliability as the operation of adding a disk device is repeated.

(D) Disks can be added further on a one by one basis.

The advantages (A) through (D) will be described below.

Firstly, the advantage of being possible to extend the storage capacity by adding a disk while the disk array device is being operated will be described. This advantage is realized by carrying out the operation of copying data, which arises as a result of adding a disk, in the background to make it possible to write the data to be written to any of the origin of copying partitions for a write operation in an IO process also to the corresponding destination of copying partition. For example, when adding a disk device 24 as shown in FIG. 3, the disk array controller 11 carries out the processing operation of copying the data of the partitions 100, 110, 120 and 130 to the partitions 104, 114, 124 and 134 in the background and writes the data to be written to the partition 100, the data to be written to the partition 110, the data to be written to the partition 120 and the data to be written to the partition 130 in an IO process also to the partition 104, the partition 114, the partition 124 and the partition 134 respectively. By doing so, all the data written in the IO process are also written to the new partitions in the operation of copying data that is carried out as a result of adding a disk device and hence it is possible to add a disk device while the disk array is being operated on line. This means that the user can increase the storage capacity without suspending the ongoing job.

Now, the advantage that it is not necessary to recognize the progress of the data copying operation that arises as a result of adding a disk during an IO process will be described. As pointed out above, during the operation of copying data as a result of adding a disk device, the data being written in an IO process are also written to the new partitions. Thus, the data written in the IO process are written to both the partitions where data are already copied and the new partitions. In other words, the written data are reflected to the new partitions. On the other hand, the data written in the IO process to the regions where data are not copied yet are copied after writing data to both of the partition groups. In other words, the data are written twice to the new partitions but no problem arises because the same data are written. Thus, data are secured when they are written to both of the partition groups if the progress of the data copying operation that arises as a result of adding a disk during an IO process is not recognized. Therefore, it is not necessary to carry out a synchronized inter-process operation even in a large system comprising a plurality of microprocessors to provide an advantage that it is possible to configure a system that are less prone to troubles.

Figure 7:
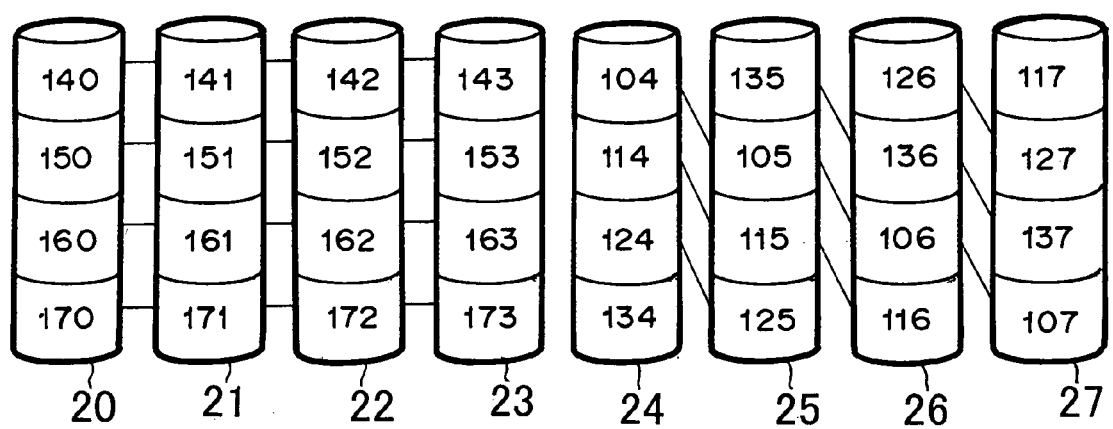
FIG. 7 is a schematic illustration of the configuration of a disk array of RAID5 (3D+P) in an initial state whose storage capacity is extended to a double by adding four disk devices.

Now, the advantage that the RAID configuration is divided into two independent RAID configurations to double the reliability as the operation of adding a disk device is repeated will be described. When disks are added to a disk array of RAID5 (3D+P) as shown in FIG. 2 by means of the above described technique, the configuration of the disk array will be such as shown in FIG. 7 when four disk devices are added to make the total number of disk devices equal to eight. The redundancy groups of this arrangement include a first redundancy group of partitions 104, 105, 106 and 107, a second redundancy group of partitions 114, 115, 116 and 117, a third redundancy group of partitions 124, 125, 126 and 127, a fourth redundancy group of partitions 134, 135, 136 and 137, a fifth redundancy group of partitions 140, 141, 142 and 143, a sixth redundancy group of partitions 150, 151, 152 and 153, a seventh redundancy group of partitions 160, 161, 161 and 163 and an eighth redundancy group of partitions 170, 171, 172 and 173. The first through fourth redundancy groups uses only disk devices 24, 25, 26 and 27, whereas the fifth through eighth redundancy groups uses only disk devices 20, 21, 22 and 23. In other words, there is no redundancy group that is spread over the four disk devices 20 through 23 that exist from the very beginning and the four disk devices 24 through 27 that are added later. Thus, the RAID configuration is divided into two independent RAID configurations. Therefore, it is possible to acquire the reliability of withstanding a situation where one of the disk devices 20 through 23 and one of the disk devices 24 through 27 become faulty. In other words, while only a single disk device can be degenerated in a RAID configuration of RAID5 (7D+1) formed by eight disk devices, two disk devices can be degenerated in two independent RAID configurations, each being formed by four disk devices because a single disk device can be degenerated in each RAID configuration of RAID5 (3D+P).

Figure 8:
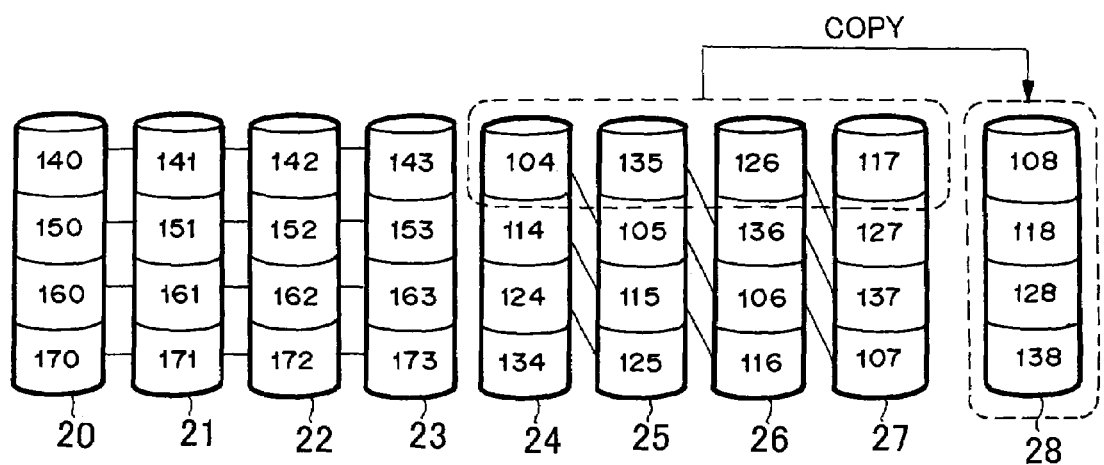
FIG. 8 is a schematic illustration of the process of extending the storage capacity of a disk array of RAID5 (3D+P), to which four disk devices have been added, by further adding another disk device.

Finally, the advantage that disks can be added further on a one by one basis will be described. FIG. 7 shows a configuration of eight disk devices obtained as a result of adding disk devices. Referring to FIG. 7, the first through fourth redundancy groups constituted by the partitions of disk devices 24, 25, 26 and 27 are same as those formed by combining partitions that are arranged aslant as shown in FIG. 2, which is used above to define the RAID configuration. Therefore, the above-described procedure can be followed to add still another disk device. More specifically, the data in the uppermost partitions 104, 135, 126 and 117 of the disk devices 24, 25, 26 and 27 are copied to the partitions 108, 118, 128 and 138 of the added disk device 28 by using the technique that is used for the first added disk and, when the copying operation is completed, a new redundancy group is defined for the original uppermost positions. As it is possible to add disk devices on a one by one basis, the user can enjoy the advantage of being able to increase the storage capacity infinitely without reconfiguring the RAID configuration. As will be discussed hereinafter, it is possible to combine not the partitions arranged aslant in the disk devices but the partitions of a same level of the disk devices for initially defining the RAID configuration. It is also possible to add a new disk device to the disk devices 20 through 23 shown in FIG. 8 in order to extend the storage capacity.

EXAMPLE 1 OF 1ST EMBODIMENT

Figure 9:
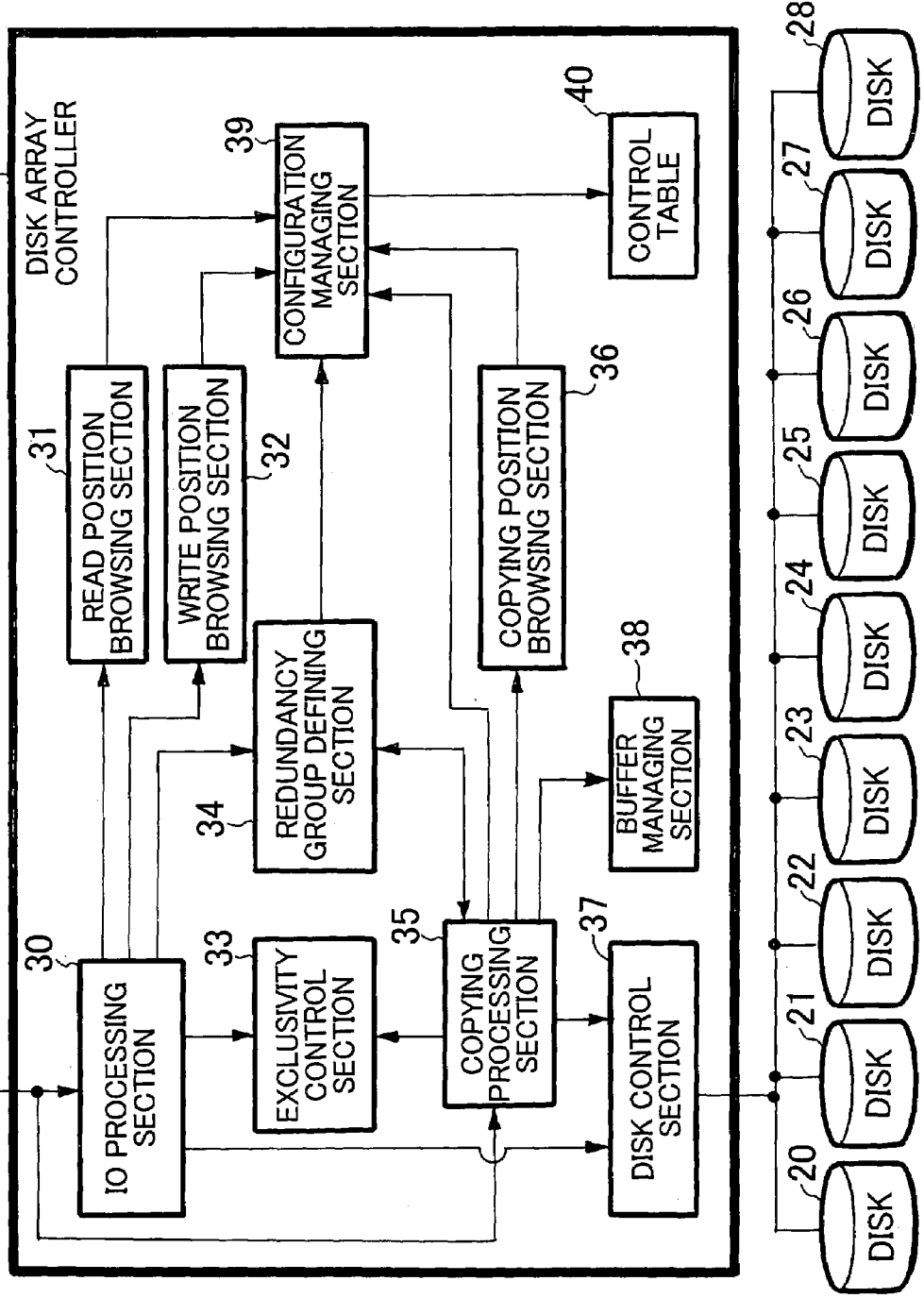
FIG. 9 is a schematic block diagram of the disk array device of Example 1 of the first embodiment of the present invention.

Referring now to FIG. 9, in the disk array device of the first embodiment in Example 1, the disk array controller 11 includes an IO processing section 30, a read position browsing section 31, a write position browsing section 32, an exclusive control section 33, a redundancy group defining section 34, a copying processing section 35, a copying position browsing section 36, a disk control section 37, a buffer managing section 38, a configuration managing section 39 and a control table 40. The control table 40 is typically generated in a local memory 17 as shown in FIG. 1 and the functional means 30 through 39 can be realized by using a microprocessor 16 and a program stored in the ROM contained in the microprocessor 16 or the local memory 17. More specifically, the program stored in the ROM or the local memory 17 is read by the microprocessor 16 and the function means 30 through 39 are realized on the microprocessor 16 by controlling the operation of the microprocessor 16.

In the disk array controller 11, the command from the host computer 10 is processed mainly by the IO processing section 30. If the command is a read command, the IO processing section 30 accesses the appropriate one of the disk devices 20 through 28 by way of the disk control section 37 after inquiring the read position browsing section 31 for the disk number and so on. If the command is a write command, the section 30 accesses the appropriate one of the disk devices 20 through 28 by way of the disk control section 37 after inquiring the write position browsing section 32 for the disk number and so on. The operation of moving data that arises as a result of adding a disk is processed mainly by the copying processing section 35. More specifically, the copying processing section 35 secures the buffer to be used for the copying operation by means of the buffer managing section 38 and accesses the appropriate one of the disk devices 20 through 28 by way of the disk control section 37 after inquiring the copying position browsing section 36 for the disk number of the origin of copying and the destination of copying so as to modify the configuration of the redundancy groups and prepare a new redundancy group by means of the redundancy group defining section 34. Information on the configuration and related pieces of information are stored in the control table 40 and each of the browsing sections refers to or updates the information stored in the control table 40 by way of the configuration managing section 39. The exclusive control section 33 is provided in order to prevent the IO processing section 30 and the copying processing section 35 from competing with each other when they refer to the control table 40.

FIG. 10 is a schematic illustration of exemplary contents of the control table 40 that corresponds to a disk array of RAID5 (3D+P) in an ordinary state when the latter is configured by the redundancy group defining section 34, using four disk devices 20 through 23. The control table 40 contains a state flag 41 indicating "ordinary" or "addition", the RAID type 42 that indicates the RAID level of the disk array being provided, the current number of the generated redundancy groups 43, the number of partitions 44 that constitute a redundancy group, the number of times of addition up to now 45 and configuration managing information 46. The configuration managing information 46 includes ordinary configuration information 47 and addition-caused configuration information 48. Disk partition information is defined for each redundancy group with regard to both the ordinary configuration and the addition-caused configuration. The disk partition information of each redundancy group includes the disk numbers 49 where the partitions constituting the redundancy group are found, the partition positions 50 indicating the cardinal numbers of the partitions on the respective disks and the partition numbers 51. In the ordinary state, the control table 40 has the following contents.

In the process of generating a disk array in an initial state, as the host computer 10 specifies the RAID type, the number of partitions constituting each redundancy group, the number of disks and the disk numbers to the disk array controller 11, the redundancy group defining section 34 determines the contents of the control table 40 on the basis of the specifying information by way of the IO processing section 30. In the instance illustrated in FIG. 10, a disk array of RAID5 (3D+P) is formed by using four disk devices 20 through 23 as described earlier by referring to FIG. 2. Then, the state flag 41 indicates "ordinary" and the RAID type 42 is "RAID5", while the number of redundancy groups 43 is "4" which is equal to the number of disk devices to be used for forming the redundancy groups and the number of partitions 44 that constitute each redundancy group is equal to "4", which is the sum of the number of data 3 and that of parity 1. The number of times of addition 45 is "0". The configuration managing information 46 includes only ordinary configuration information 47. The disk partition information of the first redundancy group includes disk numbers 49, or the numbers of the disk devices 20, 21, 22 and 23 arranged in the ascending order, partition positions 50 starting from 0 and incremented by one so as to be 0, 1, 2 and 3 and partition numbers 51 of the partitions. Thus, it is clear that the first redundancy group is constituted by four partitions including the partition 0 of the disk device 20, the partition 1 of the disk device 21, the partition 2 of the disk device 22 and the partition 3 of the disk device 23. The disk partition information of each of the second through fourth redundancy groups includes disk numbers 49 starting from the disk number of the second disk of the immediately preceding redundancy group and arranged in the ascending order and partition position 50 starting from 0 and incremented by one so as to be 0, 1, 2 and 3.

Then, the operation of the disk array controller 11 of this example will be described below. Assume here that a disk device 24 is added to the disk array of FIG. 2 in order to extend the storage capacity of the disk array as described above by referring to FIGS. 3 and 4.

Figure 11:
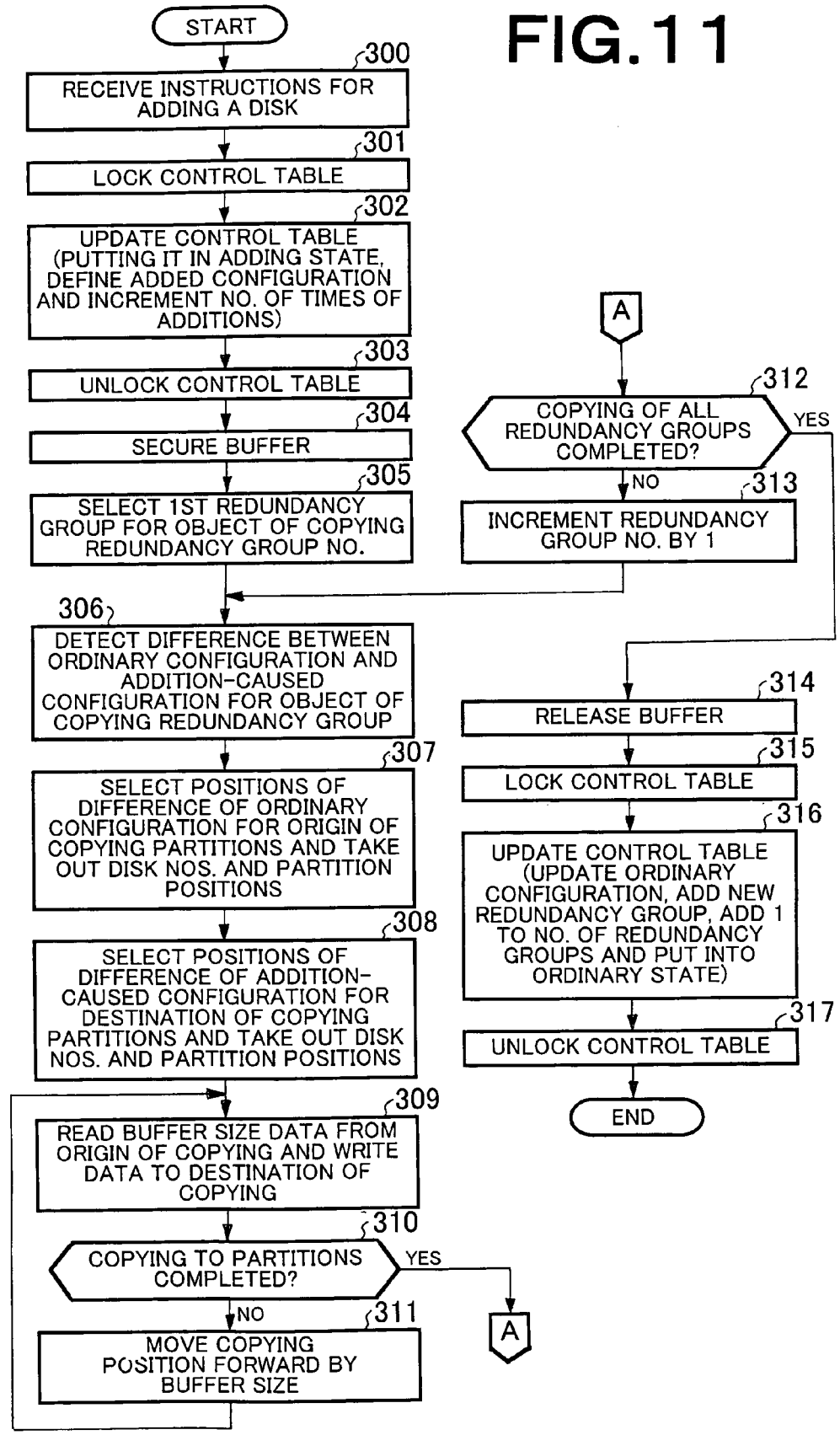
FIG. 11 is a flow chart of the disk adding processing operation of the disk array device of Example 1 of the first embodiment of the invention.

The operator gives instructions for adding a disk to the disk array controller 11 by way of the host computer 10, specifying the disk group (20 through 23), the storage capacity of which is to be extended, and the disk device 24 to be added. Then, the disk array controller 11 executes a processing operation for adding a disk device as shown in FIG. 11.

Firstly, upon receiving the instructions for adding a disk device from the host computer 10 (Step 300), the copying processing section 35 has the exclusivity control section 33 lock the control table (Step 301) and update the control table (Step 302). The control table 40 is unlocked at the time of completion of updating the control table 40 (Step 303). The control table 40 is locked in order to prohibit the IO processing section 30 from referring to the control table 40 that is being updated when a read command processing operation and a write command processing operation are competing with each other, a situation that will be described hereinafter.

The control table 40 is updated in Step 302 in such a way that the control table 40 for an ordinary state as shown in FIG. 10 is replaced by a control table 40 for an "adding state" as shown in FIG. 12. More specifically, the copying processing section 35 accesses the control table 40 by way of the configuration managing section 39 and copies the ordinary configuration information 47 to the addition-caused configuration information 48. Then, it updates the number of times of addition 0 to 1 and the disk number of 24 of the added disk device is entered for the first disk numbers 49 of each redundancy group. As for partition positions 50, the partition position of the first redundancy group is made to start from 0, which is the number of times of addition, and incremented by 1 for the succeeding redundancy groups so as to start from 1, 2 and 3 respectively. Then, 1 is added to the number of times of addition 45 so as to read "1" and the state flag 41 is updated to "addition".

Then, the copying processing section 35 has the buffer managing section 38 secure the buffer to be used for the copying process (Step 304) and selects the redundancy group number of the object of copying for the first redundancy group (Step 305). The subsequent steps 306 through 311 show the copying process in a redundancy group.

Firstly, the copying processing section 35 has the copying position browsing section 36 browse for the copying position (Steps 306 through 308). More specifically, the copying position browsing section 36 accesses the control table 40 by way of the configuration managing section 39 and detects the difference between the ordinary configuration information 47 and the addition-caused configuration information 48 (Step 306) so as to find that the partition 0 of the disk device 20 is replaced by the partition 0 of the disk device 24. Then, the copying position browsing section 36 selects the partition 0 of the disk device 20 as origin of copying partition (Step 307) and selects the partition 0 of the disk device 24 as destination of copying partition (Step 308).

Thereafter, the copying processing section 35 reads the data of the buffer size of the secured buffer from the partition of the origin of copying disk device to the buffer by way of the disk control section 37 and subsequently writes the data from the buffer to the partition of the destination of copying disk device (Step 309). If the copying operation is not completed for the entire partition (NO in Step 310), the copying position is made to advance by the buffer size (Step 311) and repeats the copying operation (Step 309). If, on the other hand, the copying is completed, the copying operation of the redundancy group is completed.

Then, the copying processing section 35 determines if the operation of copying the data of all the redundancy groups that are object of copying (Step 312). If the operation of copying the data of all the redundancy groups that are object of copying is not completed, the redundancy group number is incremented by one (Step 313) and the operation returns to Step 306 to carry out the operation of copying the data of the next redundancy group. When the operation of copying the data of all the redundancy groups that are object of copying is completed, the copying processing section 35 releases the buffer it has acquired by way of the buffer managing section 38 (Step 314) and has the exclusivity control section 33 lock the control table 40 (Step 315). Then, it updates the control table 40 (Step 316) and, after updating the control table 40, unlocks the control table 40 (Step 317). The control table 40 is locked in order to prohibit the IO processing section 30 from referring to the control table 40 that is being updated when a read command processing operation and a write command processing operation are competing with each other, a situation that will be described hereinafter.

The control table 40 is updated in Step 316 in such a way that the control table 40 for an "adding state" as shown in FIG. 12 is replaced by a control table 40 for an ordinary state as shown in FIG. 13. More specifically, the copying processing section 35 firstly adds the entry of the fifth redundancy group to the ordinary configuration information 47 and the addition-caused configuration information 48 and selects the partition 0 of the disk device 20, the partition 0 of the disk device 21, the partition 0 of the disk device 22 and the partition 0 of the disk device 23 that constitute the difference between the ordinary configuration information 47 and the addition-caused information 48 for the fifth redundancy group. Then, it copies the information on the first through fourth redundancy groups in the addition-caused configuration information 48 to the ordinary configuration information 47 and clears the addition-caused configuration information 48. Then, 1 is added to the number of redundancy groups 43 to make it equal to "5" and the state flag 41 is updated to "ordinary".

The operation for adding a first additional disk device 24 is described above. A basically same operation is carried out to add a second additional disk device 25. Since a first additional disk device 24 is added and a fifth redundancy group is newly generated, the data of the first through fourth redundancy groups, the fifth redundancy group being excepted, are object of copying. FIG. 14 is a schematic illustration of the contents of the control table 40 that are updated in Step 302 when the second additional disk device 25 is added. FIG. 15 is a schematic illustration of the contents of the control table 40 that are updated in Step 316 after the completion of the copying operation.

A processing operation described above for adding the second additional disk device 25 is carried out when adding a third additional disk device 26 and when adding a fourth additional disk device 27. When the first through fourth redundancy groups formed on the added disk devices 24 through 27 and the fifth through eighth redundancy groups formed on the initial disk devices 20 through 23 are separated from each other for RAID configuration, it is possible to add a disk device 28 to the added disk devices 24 through 27 or the initial disk devices 20 through 23.

Figure 16:
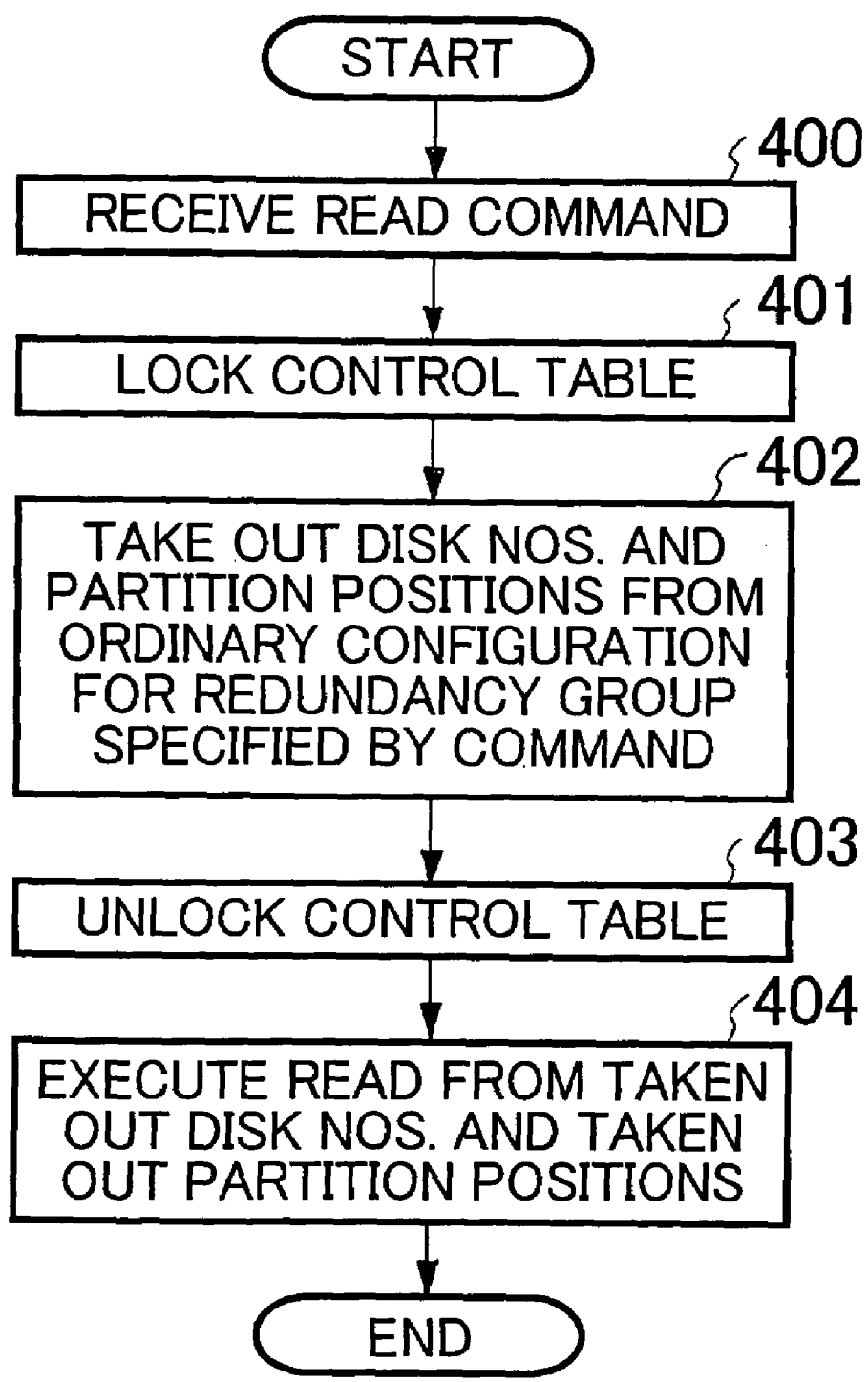
FIG. 16 is a flow chart of a read command processing operation of the disk array device of Example 1 of the first embodiment.

Now, the operation of the disk array controller 11 that takes place when a read command is issued from the host computer 10 will be described by referring to FIG. 16. As the IO processing section 30 of the disk array controller 11 receives a read command (Step 400), it has the exclusivity control section 33 lock the control table 40 (Step 401) and has the read position browsing section 31 take out the disk numbers and the partition positions of the redundancy group specified by the read command from the ordinary configuration information 47 in the control table 40 (Step 402). Then, it unlocks the control table 40 (Step 403). Thereafter, the IO processing section 30 reads the relevant data of the disk array by way of the disk control section 37 according to the disk numbers and the partition positions taken out by using the read position browsing section 31 in Step 402. The addition-caused configuration information 48 is not used for the operation of processing the read command.

If, for example, the disk array is in the initial state as shown in FIG. 2, the contents of the control table 40 are those shown in FIG. 10 so that the partition 100 of the disk device 20, the partition 101 of the disk device 21, the partition 102 of the disk device 22 and the partition 103 of the disk device 23 are accessed according to the read command specifying the first redundancy group. Thus, for example, the operation of reading the data of the first partition is carried out on the partition 100 of the disk device 20. However, as the disk device 24 is added and the disk array is extended as shown in FIG. 4, the control table 40 is updated as shown in FIG. 13 so that now the partition 104 of the disk device 24, the partition 101 of the disk device 21, the partition 102 of the disk device 22 and the partition 103 of the disk device 23 are accessed according to the read command specifying the first redundancy group. Thus, for example, the operation of reading the data of the first partition is carried out not on the partition 100 of the disk device 20 but on the partition 104 of the disk device 24.

Now, the operation of the disk array controller 11 that takes place when a write command is issued from the host computer 10 will be described by referring to FIG. 17. As the IO processing section 30 of the disk array controller 11 receives a write command (Step 500), it has the exclusivity control section 33 lock the control table 40 (Step 501) and has the write position browsing section 32 detect the write positions (Steps 502 through 505). More specifically, the write position browsing section 32 takes out the disk numbers and the partition positions of the redundancy group specified by the write command from the ordinary configuration information 47 in the control table 40 (Step 502).

Then, it confirms the state flag 41 (Step 503) and, if the flag indicates an adding state, it detects the difference between the ordinary configuration information 47 and the addition-caused configuration information 48 (Step 504) and adds the relevant data as data to be written also to the partition detected as difference (Step 505). If the write command is for the first redundancy group in the control table 40 illustrated in FIG. 12, the partition 0 of the disk device 20 in the ordinary configuration information 47 is replaced by the partition 0 of the disk device 24 in the addition-caused configuration information 48 to make a difference so that the data to be written to the partition 0 of the disk device 20 is added to the relevant data so as to be written to the partition 0 of the disk device 24. Then, the IO processing section 30 unlocks the control table 40 (Step 506) and carries out the operation of writing data to the partitions of the disk devices with the disk numbers taken out in Step 502 and Step 505 according to the write command (Step 507).

OTHER EMBODIMENTS

While the present invention is applied to a disk array of RAID5 (3D+P) for the above described embodiment and example, the present invention is also applicable to a disk array of any RAID5 type other than RAID5 (3D+P) type and also to a disk array of any RAID type other than RAID5 type such as RAID1, RAID2, RAID3, RAID4 or RAID6 type. The storage region of each disk device is equally divided by five when the present invention is applied to a disk array of RAID5 (4D+P) and the storage region of each disk device is equally divided by six when the present invention is applied to a disk array of RAID5 (5D+P), whereas the storage region of each disk device is equally divided by two when the present invention is applied to a disk array of RAID1 and the storage region of each disk device is equally divided also by six when the present invention is applied to a disk array of RAID6 (4D+P+Q). A method of adding a disk device according to the invention can be realized by equally dividing the storage region of each disk device by the smallest number of disk devices necessary for constituting a disk array of the RAID type.

While the storage region of each disk device of a disk array of RAID5 (3D+P) is equally divided by four in the above description, it is also possible to equally divide the storage region by eight or by sixteen. In short, it is possible to add a disk device according to the invention by equally dividing the storage region of each disk device by a multiple of the necessary smallest number N of disk devices for the RAID type, or M×N (M being a positive integer), regardless of the RAID type. If the value of a is not smaller than 2, a new redundancy groups are generated each time a disk device is added.

While all the disk devices 20 through 28 connected to the disk array controller 11 have a same storage capacity in the above description, they do not necessarily have to have a same storage capacity. If the initial disk devices that are used initially to generate a disk array have different storage capacities and the smallest capacity of them is X, the present invention can be applied by equally dividing the X storage capacity from the head of each of all the initial disk devices by the smallest number N of disk devices by a multiple thereof, or M×N. The above description also applies to the added disk devices. In short, the expression of equally dividing the storage region of a disk device by N or by M×N for the purpose of the present invention does not always mean that all the storage region of the disk device is equally divided by N or by M×N but may mean that the storage region of X storage capacity from the head of the disk device is equally divided by N or by M×N.

As another embodiment of the invention, it is also possible to combine the partitions of a same level of the disk devices when defining the initial RAID configuration in place of combining the partitions that are arranged aslant. For example, referring to FIG. 2, the first redundancy group may be defined by combining the four partitions of a same level including the uppermost partition 100 of the disk device 20, the uppermost partition 110 of the disk device 21, the uppermost partition 120 of the disk device 22 and the uppermost partition 130 of the disk device 23. Similarly, the second redundancy group may be defined by combining the four partitions of another same level including the partitions 131, 101, 111 and 121 and the third redundancy group may be defined by combining the four partitions of still another same level including the partitions 122, 132, 102 and 112, while the fourth redundancy group may be defined by combining the four partitions of still another level including the partitions 113, 123, 133 and 103. Then, when the disk device 24 is added as shown in FIG. 3, data stored in the uppermost partition 100 of the disk device 20 is copied to the partition 104 of the disk device 24 and the data stored in the second level partition 101 of the disk device 21 is copied to the partition 114 of the disk device 24, while the data stored in the third level partition 102 of the disk device 22 is copied to the partition 124 of the disk device 24 and the data stored in the fourth level partition 103 of the disk device 23 is copied to the partition 134 of the disk device 24. As the copying operation is completed, the partitions 100, 101, 102 and 103 are excluded form the redundancy groups to redefine the first redundancy group of the partitions 104, 110, 120 and 130, the second redundancy group of the partitions 131, 114, 111 and 121, the third redundancy group of the partitions 122, 132, 124 and 112, and the fourth redundancy group of the partitions 113, 123, 133 and 134. The partitions 100, 101, 102 and 103 that are excluded from the redundancy groups are redefined for the fifth redundancy group.

As described above in detail, a disk array device and a method of extending the storage capacity of a disk array device according to the invention are useful as a device and a method adapted to extend the storage capacity of a disk array constituted by a plurality of disk devices. They are particularly suited as a device and a method for extending the storage capacity of a disk device of RAID5 type or the like without suspending the operation of the system of the disk array device.

What is claimed is:

1. A disk array device having a plurality of disks, each of said disks being divided into a plurality of partitions, and a plurality of redundancy groups, each of said redundancy groups having a plurality of partitions, each of said partitions of each of said redundancy groups belonging to a disk different from the disks the other partitions of the same redundancy group belong to, said disk array device comprising:

means for dividing a newly added disk into a plurality of partitions;

means for selecting, as an origin of copying a partition, a partition included in one of the existing redundancy groups but not sharing a disk with any other origin of copying a partition of any other existing redundancy group;

means for selecting a partition of said newly added disk as a destination of copying a partition;

means for repeating copying the data of an origin of copying a partition to a destination of copying a partition for a plurality of existing redundancy groups;

means for excluding the origin of copying partitions from the existing redundancy groups said origin of copying partitions have belonged to and adding the destination of copying partitions to the redundancy groups the origin of copying partitions have belonged to; and means for preparing a new redundancy group by collecting the excluded plurality of partitions.

2. A disk array device having a disk array controller for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to:

said disk array controller being adapted to select N partitions from said N redundancy groups, each of N partitions being selected from each of said N redundancy groups, said N partitions being selected from different initial disk devices, so as to define the selected N partitions as origin of copying partitions and define the N partitions of a first added disk device formed by equally dividing the storage region thereof by N as destination of copying partitions;

said controller having:

a copying processing section for copying the data stored in the origin of copying partitions to the destination of copying partitions; and a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

3. The device according to claim 2, wherein said copying processing section selects N different partitions from the initial disk devices other than said new redundancy group generated as a result of extending the storage capacity, each of N partitions being selected from each of the N redundancy groups, so as to define the selected N partitions as origin of copying partitions and defines the N partitions of a second added disk device formed by equally dividing the storage region thereof by N as destination of copying partitions so as to copy the data stored in the origin of copying partitions to the destination of copying partitions and, at the time of completion of the copying, said redundancy group defining section excludes the origin of copying partitions from the original redundancy groups so as to incorporate the corresponding destination of copying partitions respectively into the original redundancy groups and combines the N origin of copying partitions excluded from the original redundancy groups to generate a new redundancy group.

4. The device according to claim 3, wherein said copying processing section repeats the processing operation of extending the storage capacity up to the N-th added disk device and extends the storage capacity of the disk array so as to include the N redundancy groups generated on the N initial disk devices and the N redundancy groups generated on the N added disk devices.

5. The device according to claim 2, wherein said disk array controller is so configured as to have said copying processing section execute said processing operation of copying the data stored in the origin of copying partitions to the destination of copying partitions in the background while the disk array is being operated and further includes an IO processing section for writing the data to be written to the origin of copying partitions and to the destination of copying partitions when a write command is issued to the disk array from a host computer.

6. The device according to claim 2, wherein said predetermined RAID type is RAID5 (iD+P), where i is a positive integer not smaller than 2.

7. A disk array device having a disk array controller for providing a disk array of a predetermined RAID type and the smallest number N of initial disk devices required for said RAID type and including M sets of N redundancy groups, where M is a positive integer, each of said M times of N redundancy groups having M sets of N partitions formed by equally dividing the storage region of each of said initial disk devices by M×N, each of said partitions of each of said redundancy groups belonging to a disk different from the disks the other partitions of the same redundancy group belong to:
said disk array controller being adapted to select M×N partitions from said N redundancy groups of M sets, each of M×N partitions being selected from each of said N redundancy groups, said M×N partitions being selected from different initial disk devices, so as to define the selected M×N partitions as origin of copying partitions and define the M×N partitions of a first added disk device formed by equally dividing the storage region thereof by M×N as destination of copying partitions;
said controller having:
a copying processing section for copying the data stored in the origin of copying partitions to the destination of copying partitions; and
a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

8. The device according to claim 7, wherein said copying processing section selects M×N different partitions from the initial disk devices other than said new redundancy group generated as a result of extending the storage capacity, each of M×N partitions being selected from the N redundancy groups of each of the M sets, so as to define the selected M×N partitions as origin of copying partitions and defines the M×N partitions of a second added disk device formed by equally dividing the storage region thereof by M×N as destination of copying partitions so as to copy the data stored in the origin of copying partitions to the destination of copying partitions and, at the time of completion of the copying, said redundancy group defining section excludes the origin of copying partitions from the original redundancy groups so as to incorporate the corresponding destination of copying partitions respectively into the original redundancy groups and combines the N origin of copying partitions excluded from the original redundancy groups to generate new a redundancy groups.

9. The device according to claim 8, wherein said copying processing section repeats the processing operation of extending the storage capacity up to the N-th added disk device and extends the storage capacity of the disk array so as to include the M×N redundancy groups generated on the N initial disk devices and the M×N redundancy groups generated on the N added disk devices.

10. The device according to claim 7, wherein said disk array controller is so configured as to have said copying processing section execute said processing operation of copying the data stored in the origin of copying partitions to the destination of copying partitions in the background while the disk array is being operated and further includes an IO processing section for writing the data to be written to the origin of copying partitions and to the destination of copying partitions when a write command is issued to the disk array from a host computer.

11. The device according to claim 7, wherein said predetermined RAID type is RAID5 (iD+P), where i is a positive integer not smaller than 2.

12. A disk array device having a disk array controller for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to:
said disk array controller being adapted to select, each time an additional disk device is added, N partitions from the N redundancy groups other than the new redundancy group generated as a result of the extension of the storage capacity, each of N partitions being selected from each of said N redundancy groups, said N partitions being selected from different initial disk devices, so as to define the selected N partitions as origin of copying partitions and define said N partitions of said added disk device as destination of copying partitions;
said controller having:
a copying processing section for copying the data stored in the origin of copying partitions to the destination of copying partitions; and
a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

13. The device according to claim 12, wherein said copying processing section adds disk devices up to N-th additional disk device and extends the storage capacity of the disk array to include the N redundancy groups generated on the N initial disk devices and the N redundancy groups generated on the N added disk devices.

14. The device according to claim 12, wherein said disk array controller is so configured as to have said copying processing section execute said processing operation of copying the data stored in the origin of copying partitions to the destination of copying partitions in the background while the disk array is being operated and further includes an IO processing section for writing the data to be written to the origin of copying partitions and to the destination of copying partitions when a write command is issued to the disk array from a host computer.

15. The device according to claim 12, wherein said predetermined RAID type is RAID5 (iD+P), where i is a positive integer not smaller than 2.

16. A disk array device having a disk array controller for providing a disk array of a predetermined RAID type and the smallest number N of initial disk devices required for said RAID type and including M sets of N redundancy groups, where M is a positive integer, each of said N redundancy groups having M sets of N partitions formed by equally dividing the storage region of each of said initial disk devices by M×N, each of said partitions of each of said redundancy groups belonging to a disk different from the disks the other partitions of the same redundancy group belong to:
- said disk array controller being adapted to select, each time an additional disk device is added, M×N partitions from the N redundancy groups of M sets other than the new redundancy group generated as a result of the extension of the storage capacity, each of M×N partitions being selected from each of said N redundancy groups, said M×N partitions being selected from different initial disk devices, so as to define the selected M×N partitions as origin of copying partitions and define said M×N partitions of said added disk device as destination of copying partitions;
- said controller having:
- a copying processing section for copying the data stored in the origin of copying partitions to the destination of copying partitions; and
- a redundancy group defining section for excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

17. The device according to claim 16, wherein said disk array controller adds disk devices up to N-th additional disk device and extends the storage capacity of the disk array to include the M×N redundancy groups generated on the N initial disk devices and the M×N redundancy groups generated on the N added disk devices.

18. The device according to claim 16, wherein said disk array controller is so configured as to have said copying processing section execute said processing operation of copying the data stored in the origin of copying partitions to the destination of copying partitions in the background while the disk array is being operated and further includes an IO processing section for writing the data to be written to the origin of copying partitions and to the destination of copying partitions when a write command is issued to the disk array from a host computer.

19. The device according to claim 16, wherein said predetermined RAID type is RAID5 (iD+P), where i is a positive integer not smaller than 2.

20. A disk array device comprising a disk array controller connected to a host computer and a plurality of disk devices connected to the disk array controller to provide a disk array of a predetermined RAID type:
- said disk array controller having an IO processing section for processing an IO command from said host computer, a copying processing section for copying data to accommodate an addition of a disk, a redundancy group defining section for defining redundancy groups, a disk control section for controlling said disk devices, a control table for storing configuration information and other pieces of information of the disk array, a read position browsing section, a write position browsing section and a copying position browsing section;
- said control table having a configuration of storing a state flag indicating the state of said disk array of an addition of a disk in progress or not, the number of times of addition of a disk device, ordinary configuration information and addition-caused configuration information, said ordinary configuration information being so initialized as to contain disk partition information indicating the disk device each of the partitions of each redundancy group belonging to, said disk array being so generated as to have the smallest number N of initial disk devices required for said RAID type and include N redundancy groups, each of said N redundancy groups having N partitions formed by equally dividing the storage region of each of said initial disk devices by N, each of said partitions of each of said redundancy groups belonging to a disk different from the disks the other partitions of the redundancy group belong to;
- at the time of extending the storage capacity of said disk array by adding an additional disk device having N partitions, each being formed by equally dividing the storage region thereof by N, said copying processing section being adapted to select N different partitions from the initial disk devices other than said new redundancy group generated as a result of extending the storage capacity, each of N partitions being selected from each of the N redundancy groups, according to the number of times of addition up to now and the ordinary configuration information in said control table, define configuration information obtained by replacing the information on the selected N partitions in said ordinary configuration information by information on the corresponding partitions of said added disk device as addition-caused configuration information in said control table, detect the difference between said ordinary configuration information and said addition-caused configuration information for each of said N redundancy groups by means of said copying position browsing section so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate a new redundancy group by means of said redundancy group defining section;
- upon receiving a read command for said disk array from said host computer, said IO processing section determining the disk device and partition for reading data from the ordinary configuration information in the control table by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring from the ordinary configuration information in the control table disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

21. The device according to claim 20, wherein said disk array controller further has an exclusivity control section and, when said control table is referred to and updated, said copying processing section and said IO processing section lock said control table by means of said exclusivity control section.

22. The device according to claim 20, wherein said predetermined RAID type is RAID5 (iD+P), where i is a positive integer not smaller than 2.

23. A disk array device comprising a disk array controller connected to a host computer and a plurality of disk devices connected to the disk array controller to provide a disk array of a predetermined RAID type:

said disk array controller having an IO processing section for processing an IO command from said host computer, a copying processing section for copying data to accommodate an addition of a disk, a redundancy group defining section for defining redundancy groups, a disk control section for controlling said disk devices, a control table for storing configuration information and other pieces of information of the disk array, a read position browsing section, a write position browsing section and a copying position browsing section;

said control table having a configuration of storing a state flag indicating the state of said disk array of an addition of a disk in progress or not, the number of times of addition of a disk device, ordinary configuration information and addition-caused configuration information, said ordinary configuration information being so initialized as to contain disk partition information indicating the disk device each of the partitions of each redundancy group belonging to, said disk array being so generated as to have the smallest number N of initial disk devices required for said RAID type and include N redundancy groups, each of said N redundancy groups having M sets of N partitions, where M is a positive integer, formed by equally dividing the storage region of each of said initial disk devices by M×N, each of said partitions of each of said redundancy groups belonging to a disk different from the disks the other partitions of the redundancy group belong to;

at the time of extending the storage region of said disk array by adding an additional disk device having M×N partitions, each being formed by equally dividing the storage region thereof by M×N, said copying processing section being adapted to select N different partitions for each of said M sets from the initial disk devices other than said new redundancy group generated as a result of extending the storage capacity, each of M×N partitions being selected from each of the N redundancy group, according to the number of times of addition up to now and the ordinary configuration information in said control table, define configuration information obtained by replacing the information on the selected M×N partitions in said ordinary configuration information by information on the corresponding partitions of said added disk device as addition-caused configuration information in said control table, detect the difference between said ordinary configuration information and said addition-caused configuration information for each of said N redundancy groups of each of said M sets by means of said copying position browsing section so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate new a redundancy groups by means of said redundancy group defining section;

upon receiving a read command for said disk array from said host computer, said IO processing section determining the disk device and partition for reading data from the ordinary configuration information in the control table by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

24. The device according to claim 23, wherein said disk array controller further has an exclusivity control section and, when said control table is referred to and updated, said copying processing section and said IO processing section lock said control table by means of said exclusivity control section.

25. The device according to claim 23, wherein said predetermined RAID type is RAID5 (iD+P), where i is a positive integer not smaller than 2.

26. A method of extending the storage capacity of a disk array device having a plurality of disks, each of said disks being divided into a plurality of partitions, and a plurality of redundancy groups, each of said redundancy groups having a plurality of partitions, each of said partitions of each of said redundancy groups belonging to a disk different from the disks the other partitions of the same redundancy group belong to, said method comprising:

a step of dividing a newly added disk into a plurality of partitions;

a step of selecting, as an origin of copying a partition, a partition included in one of the existing redundancy groups but not sharing a disk with any other origin of copying a partition of any other existing redundancy group;

a step of selecting a partition of said newly added disk as a destination of copying a partition;

a step of repeating copying the data of an origin of copying a partition to a destination of copying a partition for a plurality of existing redundancy groups;

a step of excluding the origin of copying partitions from the existing redundancy groups said origin of copying partitions have belonged to and adding the destination of copying partitions to the redundancy groups the origin of copying partitions have belonged to; and a step of preparing a new redundancy group by collecting the excluded plurality of partitions.

27. A method of extending the storage capacity of a disk array device for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to, said method comprising:

a) a step of selecting N partitions from said N redundancy groups, each of N partitions being selected from each of said N redundancy groups, said N partitions being selected from different initial disk devices, so as to define the selected N partitions as origin of copying partitions and define the N partitions of a first added disk device formed by equally dividing the storage region thereof by N as destination of copying partitions and copying the data stored in the origin of copying partitions to the destination of copying partitions; and b) a step of excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

28. The method according to claim 27, further comprising:

c) a step of selecting N different partitions from the initial disk devices other than said new redundancy group generated as a result of extending the storage capacity, each of N partitions being selected from each of the N redundancy groups, so as to define the selected N partitions as origin of copying partitions and defining the N partitions of a second added disk device formed by equally dividing the storage region thereof by N as destination of copying partitions so as to copy the data stored in the origin of copying partitions to the destination of copying partitions; and d) a step of excluding the origin of copying partitions from the original redundancy groups at the time of completion of the copying so as to incorporate the corresponding destination of copying partitions respectively into the original redundancy groups and combining the N origin of copying partitions excluded from the original redundancy groups to generate a new redundancy group.

29. The method according to claim 28, wherein said steps c and d of the processing operation of extending the storage capacity are repeated up to the N-th added disk device to extend the storage capacity of the disk array so as to include the N redundancy groups generated on the N initial disk devices and the N redundancy groups generated on the N added disk devices.

30. The method according to claim 27, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

31. The method according to claim 27, wherein said predetermined RAID type is RAID5 (iD+P), where i is a positive integer not smaller than 2.

32. A method of extending the storage capacity of a disk array device for providing a disk array of a predetermined RAID type and the smallest number N of initial disk devices required for said RAID type and including M sets of N redundancy groups, where M is a positive integer, each of said M times of N redundancy groups having M sets of N partitions formed by equally dividing the storage region of each of said initial disk devices by M×N, each of said partitions of each of said redundancy groups belonging to a disk different from the disks the other partitions of the same redundancy group belong to, said method comprising:

a) a step of selecting M×N partitions from said N redundancy groups of M sets, each of M×N partitions being selected from each of said N redundancy groups, said M×N partitions being selected from different initial disk devices, so as to define the selected M×N partitions as origin of copying partitions and define the M×N partitions of a first added disk device formed by equally dividing the storage region thereof by M×N as destination of copying partitions and copying the data stored in the origin of copying partitions to the destination of copying partitions; and b) a step of excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

33. The method according to claim 32, further comprising:

c) a step of selecting M×N different partitions from the initial disk devices other than said new redundancy group generated as a result of extending the storage capacity, each of M×N partitions being selected from the N redundancy groups of each of the M sets, so as to define the selected M×N partitions as origin of copying partitions and defines the M×N partitions of a second added disk device formed by equally dividing the storage region thereof by M×N as destination of copying partitions so as to copy the data stored in the origin of copying partitions to the destination of copying partitions; and d) a step of excluding the origin of copying partitions from the original redundancy groups at the time of completion of the copying so as to incorporate the corresponding destination of copying partitions respectively into the original redundancy groups and combining the N origin of copying partitions excluded from the original redundancy groups to generate new a redundancy groups.

34. The method according to claim 33, wherein said steps c and d of the processing operation of extending the storage capacity are repeated up to the N-th added disk device to extend the storage capacity of the disk array so as to include the M×N redundancy groups generated on the N initial disk devices and the M×N redundancy groups generated on the N added disk devices.

35. The method according to claim 32, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

36. The method according to claim 32, wherein said predetermined RAID type is RAID5 (iD+P), where i is a positive integer not smaller than 2.

37. A method of extending the storage capacity of a disk array device for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to, said method comprising:

selecting, each time an additional disk device is added, N partitions from the N redundancy groups other than the new redundancy group generated as a result of the extension of the storage capacity, each of N partitions being selected from each of said N redundancy groups, said N partitions being selected from different initial disk devices, so as to define the selected N partitions as origin of copying partitions and define said N partitions of said added disk device as destination of copying partitions, copying the data stored in the origin of copying partitions to the destination of copying partitions, excluding the origin of copying partitions from the original redundancy groups, incorporating the corresponding destination of copying partitions respectively into said original redundancy groups at the time of completion of the copying and combining the N origin of copying partitions excluded from the original redundancy groups to generate a new redundancy group.

38. The method according to claim 37, wherein disk devices are added up to N-th additional disk device and the storage capacity of the disk array is extended to include the N redundancy groups generated on the N initial disk devices and the N redundancy groups generated on the N added disk devices.

39. The method according to claim 37, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

40. The method according to claim 37, wherein said predetermined RAID type is RAID5 (iD+P), where i is a positive integer not smaller than 2.

41. A method of extending the storage capacity of a disk array device for providing a disk array of a predetermined RAID type and the smallest number N of initial disk devices required for said RAID type and including M sets of N redundancy groups, where M is a positive integer, each of said N redundancy groups having M sets of N partitions formed by equally dividing the storage region of each of said initial disk devices by M×N, each of said partitions of each of said redundancy groups belonging to a disk different from the disks the other partitions of the same redundancy group belong to, said method comprising:

selecting, each time an additional disk device is added, M×N partitions from the N redundancy groups of M sets other than the new redundancy group generated as a result of the extension of the storage capacity, each of M×N partitions being selected from each of said N redundancy groups, said M×N partitions being selected from different initial disk devices, so as to define the selected M×N partitions as origin of copying partitions and define said M×N partitions of said added disk device as destination of copying partitions, copying the data stored in the origin of copying partitions to the destination of copying partitions, excluding the origin of copying partitions from the original redundancy groups, incorporating the corresponding destination of copying partitions respectively into said original redundancy groups at the time of completion of the copying and combining the N origin of copying partitions excluded from the original redundancy groups to generate new a redundancy groups.

42. The method according to claim 41, wherein disk devices are added up to N-th additional disk device and the storage capacity of the disk array is extended to include the M×N redundancy groups generated on the N initial disk devices and the M×N redundancy groups generated on the N added disk devices.

43. The method according to claim 41, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

44. The method according to claim 41, wherein said predetermined RAID type is RAID5 (iD+P), where i is a positive integer not smaller than 2.

45. A method of extending the storage capacity of a disk array device comprising a disk array controller connected to a host computer and a plurality of disk devices connected to the disk array controller to provide a disk array of a predetermined RAID type:

said disk array controller defining a control table having a configuration of storing a state flag indicating the state of said disk array of an addition of a disk in progress or not, the number of times of addition of a disk device, ordinary configuration information and addition-caused configuration information so as to make said ordinary configuration information contain disk partition information indicating the disk device each of the partitions of each redundancy group belonging to, said disk array being so generated as to have the smallest number N of initial disk devices required for said RAID type and include N redundancy groups, each of said N redundancy groups having N partitions formed by equally dividing the storage region of each of said initial disk devices by N, each of said partitions of each of said redundancy groups belonging to a disk different from the disks the other partitions of the redundancy group belong to;

at the time of extending the storage capacity of said disk array by adding an additional disk device having N partitions, each being formed by equally dividing the storage region thereof by N, the copying processing section of said disk array controller being adapted to select N different partitions from the initial disk devices other than said new redundancy group generated as a result of extending the storage capacity, each of N partitions being selected from each of the N redundancy groups, according to the number of times of addition up to now and the ordinary configuration information in said control table, define configuration information obtained by replacing the information on the selected N partitions in said ordinary configuration information by information on the corresponding partitions of said added disk device to define as addition-caused configuration information in said control table, detect the difference between said ordinary configuration information and said addition-caused configuration information for each of said N redundancy groups by means of the copying position browsing section thereof so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combine the N origin of copying partitions excluded from the original redundancy groups to generate a new redundancy group by means of the redundancy group defining section thereof, upon receiving a read command for said disk array from said host computer, the IO processing section of the disk array controller determining the disk device and the partition for reading data from by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command and executing the write operation by way of the disk control section.

46. The method according to claim 45, wherein when said control table is referred to and updated, said copying processing section and said IO processing section of said disk array controller lock said control table by means of the exclusivity control section.

47. The method according to claim 45, wherein said predetermined RAID type is RAID5 (iD+P), where i is a positive integer not smaller than 2.

48. A method of extending the storage capacity of a disk array device comprising a disk array controller connected to a host computer and a plurality of disk devices connected to the disk array controller to provide a disk array of a predetermined RAID type:

said disk array controller defining a control table having a configuration of storing a state flag indicating the state of said disk array of an addition of a disk in progress or not, the number of times of addition of a disk device, ordinary configuration information and addition-caused configuration information, said ordinary configuration information being so as to make the control table contain disk partition information indicating the disk device each of the partitions of each redundancy group belonging to, said disk array being so generated as to have the smallest number N of initial disk devices required for said RAID type and include N redundancy groups, each of said N redundancy groups having M sets of N partitions, where M is a positive integer, formed by equally dividing the storage region of each of said initial disk devices by M×N, each of said partitions of each of said redundancy groups belonging to a disk different from the disks the other partitions of the redundancy group belong to;

at the time of extending the storage capacity of said disk array by adding an additional disk device having M×N partitions, each being formed by equally dividing the storage region thereof by M×N, the copying processing section of said disk array controller being adapted to select N different partitions for each of said M sets from the initial disk devices other than said new redundancy group generated as a result of extending the storage capacity, each of M×N partitions being selected from each of the N redundancy group, according to the number of times of addition up to now and the ordinary configuration information in said control table, define configuration obtained by replacing the information on the selected M×N partitions in said ordinary configuration information by information on the corresponding partitions of said added disk device to define as addition-caused configuration information in said control table, detect the difference between said ordinary configuration information and said addition-caused configuration information for each of said N redundancy groups of each of said M sets by means of the copying position browsing section thereof so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate new a redundancy groups by means of the redundancy group defining section thereof;

upon receiving a read command for said disk array from said host computer, the IO processing section of the disk array controller determining the disk device and the partition for reading data from by acquiring disk partition information on the redundancy group specified by said read command by means of said read position browsing section thereof and executing the read operation by way of said disk control section and, upon receiving a write command for said disk array from said host computer, said IO processing section determining the disk device and the partition for writing data to by acquiring disk partition information on the redundancy group specified by said write command by means of the write position browsing section thereof and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command and executing the write operation by way of the disk control section.

49. The method according to claim 48, wherein, when said control table is referred to and updated, said copying processing section and said IO processing section of said disk array controller lock said control table by means of the exclusivity control section.

50. The method according to claim 48, wherein said predetermined RAID type is RAID5 (iD+P), where i is a positive integer not smaller than 2.

51. A computer program product embodied on a computer-readable medium and comprising codes that, when executed, cause a computer to perform a method of extending the storage capacity of a disk array device having a plurality of disks, each of said disks being divided into a plurality of partitions, and a plurality of redundancy groups, each of said redundancy groups having a plurality of partitions, each of said partitions of each of said redundancy groups belonging to a disk different from the disks the other partitions of the same redundancy group belong to, said method comprising:
 a step of dividing a newly added disk into a plurality of partitions;
 a step of selecting, as an origin of copying a partition, a partition included in one of the existing redundancy groups but not sharing a disk with any other origin of copying a partition of any other existing redundancy group;
 a step of selecting a partition of said newly added disk as a destination of copying a partition;
 a step of repeating copying the data of an origin of copying a partition to a destination of copying a partition for a plurality of existing redundancy groups;
 a step of excluding the origin of copying partitions from the existing redundancy groups said origin of copying partitions have belonged to and adding the destination of copying partitions to the redundancy groups the origin of copying partitions have belonged to; and
 a step of preparing a new redundancy group by collecting the excluded plurality of partitions.

52. A computer program product embodied on a computer-readable medium and comprising codes that, when executed, cause a computer to perform a method of extending the storage capacity of a disk array device for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to, said method comprising:
 a) a step of selecting N partitions from said N redundancy groups, each of N partitions being selected from each of said N redundancy groups, said N partitions being selected from different initial disk devices, so as to define the selected N partitions as origin of copying partitions and define the N partitions of a first added disk device formed by equally dividing the storage region thereof by N as destination of copying partitions and copying the data stored in the origin of copying partitions to the destination of copying partitions; and
 b) a step of excluding the origin of copying partitions from the original redundancy groups and incorporating the corresponding destination of copying partitions respectively into said original redundancy groups at the time of completion of the copying and combining the N origin of copying partitions excluded from the original redundancy groups to generate a new redundancy group.

53. The computer program product as set forth in claim 52, wherein said method further comprises:
 c) a step of selecting N different partitions from the initial disk devices other than said new redundancy group generated as a result of extending the storage capacity, each of N partitions being selected from each of the N redundancy groups, so as to define the selected N partitions as origin of copying partitions and defining the N partitions of a second added disk device formed by equally dividing the storage region thereof by N as destination of copying partitions so as to copy the data stored in the origin of copying partitions to the destination of copying partitions; and
 d) a step of excluding the origin of copying partitions from the original redundancy groups at the time of completion of the copying so as to incorporate the corresponding destination of copying partitions respectively into the original redundancy groups and combining the N origin of copying partitions excluded from the original redundancy groups to generate a new redundancy group.

54. The computer program product as set forth in claim 53, wherein said steps c and d of the processing operation of extending the storage capacity are repeated up to the N-th added disk device to extend the storage capacity of the disk array so as to include the N redundancy groups generated on the N initial disk devices and the N redundancy groups generated on the N added disk devices.

55. The computer program product as set forth in claim 52, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

56. The computer program product as set forth in claim 52, wherein said predetermined RAID type is RAID5 (iD+P), where i is a positive integer not smaller than 2.

57. A computer program product embodied on a computer-readable medium and comprising codes that, when executed, cause a computer to perform a method of extending the storage capacity of a disk array device for providing a disk array of a predetermined RAID type and the smallest number N of initial disk devices required for said RAID type and including M sets of N redundancy groups, where M is a positive integer, each of said M times of N redundancy groups having M sets of N partitions formed by equally dividing the storage region of each of said initial disk devices by M×N, each of said partitions of each of said redundancy groups belonging to a disk different from the disks the other partitions of the same redundancy group belong to, said method comprising:

a) a step of selecting M×N partitions from said N redundancy groups of M sets, each of M×N partitions being selected from each of said N redundancy groups, said M×N partitions being selected from different initial disk devices, so as to define the selected M×N partitions as origin of copying partitions and define the M×N partitions of a first added disk device formed by equally dividing the storage region thereof by M×N as destination of copying partitions and copying the data stored in the origin of copying partitions to the destination of copying partitions; and b) a step of excluding the origin of copying partitions from the original redundancy groups and incorporating the corresponding destination of copying partitions respectively into said original redundancy groups at the time of completion of the copying and combining the N origin of copying partitions excluded from the original redundancy groups to generate new a redundancy groups.

58. The computer program product as set forth in claim 57, wherein said method further comprises:

c) a step of selecting M×N different partitions from the initial disk devices other than said new redundancy group generated as a result of extending the storage capacity, each of M×N partitions being selected from the N redundancy groups of each of the M sets, so as to define the selected M×N partitions as origin of copying partitions and defines the M×N partitions of a second added disk device formed by equally dividing the storage region thereof by M×N as destination of copying partitions so as to copy the data stored in the origin of copying partitions to the destination of copying partitions; and d) a step of excluding the origin of copying partitions from the original redundancy groups at the time of completion of the copying so as to incorporate the corresponding destination of copying partitions respectively into the original redundancy groups and combining the N origin of copying partitions excluded from the original redundancy groups to generate new a redundancy groups.

59. The computer program product as set forth in claim 58, wherein said steps c and d of the processing operation of extending the storage capacity are repeated up to the N-th added disk device to extend the storage capacity of the disk array so as to include the M×N redundancy groups generated on the N initial disk devices and the M×N redundancy groups generated on the N added disk devices.

60. The computer program product as set forth in claim 58, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

61. The computer program product as set forth in claim 58, wherein said predetermined RAID type is RAID5 (iD+P), where i is a positive integer not smaller than 2.

62. A computer program product embodied on a computer-readable medium and comprising codes that, when executed, cause a computer to perform a method of extending the storage capacity of a disk array device for providing a disk array of a predetermined RAID type and the smallest number N of initial disk devices required for said RAID type and including N redundancy groups, each of said N redundancy groups having N partitions formed by equally dividing the storage region of each of said initial disk devices by N, each of said partitions of each of said redundancy groups belonging to a disk different from the disks the other partitions of the same redundancy group belong to, said method comprising:

selecting, each time an additional disk device is added, N partitions from the N redundancy groups other than the new redundancy group generated as a result of the extension of the storage capacity, each of N partitions being selected from each of said N redundancy groups, said N partitions being selected from different initial disk devices, so as to define the selected N partitions as origin of copying partitions and define said N partitions of said added disk device as destination of copying partitions, copying the data stored in the origin of copying partitions to the destination of copying partitions, excluding the origin of copying partitions from the original redundancy groups, incorporating the corresponding destination of copying partitions respectively into said original redundancy groups at the time of completion of the copying and combining the N origin of copying partitions excluded from the original redundancy groups to generate a new redundancy group.

63. The computer program product as set forth in claim 62, wherein disk devices are added up to N-th additional disk device and the storage capacity of the disk array is extended to include the N redundancy groups generated on the N initial disk devices and the N redundancy groups generated on the N added disk devices.

64. The computer program product as set forth in claim 62, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

65. The computer program product as set forth in claim 62, wherein said predetermined RAID type is RAID5 (iD+P), where i is a positive integer not smaller than 2.

66. A computer program product embodied on a computer-readable medium and comprising codes that, when executed, cause a computer to perform a method of extending the storage capacity of a disk array device for providing a disk array of a predetermined RAID type and the smallest number N of initial disk devices required for said RAID type and including M sets of N redundancy groups, where M is a positive integer, each of said N redundancy groups having M sets of N partitions formed by equally dividing the storage region of each of said initial disk devices by M×N, each of said partitions of each of said redundancy groups belonging to a disk different from the disks the other partitions of the same redundancy group belong to, said method comprising:

selecting, each time an additional disk device is added, M×N partitions from the N redundancy groups of M sets other than the new redundancy group generated as a result of the extension of the storage capacity, each of M×N partitions being selected from each of said N redundancy groups, said M×N partitions being selected from different initial disk devices, so as to define the selected M×N partitions as origin of copying partitions and define said M×N partitions of said added disk device as destination of copying partitions copying the data stored in the origin of copying partitions to the destination of copying partitions, excluding the origin of copying partitions from the original redundancy groups, incorporating the corresponding destination of copying partitions respectively into said original redundancy groups at the time of completion of the copying and combining the N origin of copying partitions excluded from the original redundancy groups to generate new a redundancy groups.

67. The computer program product as set forth in claim 66, wherein disk devices are added up to N-th additional disk device and the storage capacity of the disk array is extended to include the M×N redundancy groups generated on the N initial disk devices and the M×N redundancy groups generated on the N added disk devices.

68. The computer program product as set forth in claim 66, wherein said processing operation of copying the data stored in the origin of copying partitions to the destination of copying partitions is executed in the background while the disk array is being operated and the data to be written to the origin of copying partitions are also written to the destination of copying partitions when a write command is issued to the disk array from a host computer.

69. The computer program product as set forth in claim 66, wherein said predetermined RAID type is RAID5 (iD+P), where i is a positive integer not smaller than 2.

70. A computer program product embodied on a computer-readable medium and comprising codes that, when executed, cause a computer to perform a method of extending the storage capacity of a disk array device comprising a disk array controller connected to a host computer and a plurality of disk devices connected to the disk array controller to provide a disk array of a predetermined RAID type:

said disk array controller defining a control table having a configuration of storing a state flag indicating the state of said disk array of an addition of a disk in progress or not, the number of times of addition of a disk device, ordinary configuration information and addition-caused configuration information so as to make said ordinary configuration information contain disk partition information indicating the disk device each of the partitions of each redundancy group belonging to, said disk array being so generated as to have the smallest number N of initial disk devices required for said RAID type and include N redundancy groups, each of said N redundancy groups having N partitions formed by equally dividing the storage region of each of said initial disk devices by N, each of said partitions of each of said redundancy groups belonging to a disk different from the disks the other partitions of the redundancy group belong to;

at the time of extending the storage region of said disk array by adding an additional disk device having N partitions, each being formed by equally dividing the storage region thereof by N, the copying processing section of said disk array controller being adapted to select N different partitions from the initial disk devices other than said new redundancy group generated as a result of extending the storage capacity, each of N partitions being selected from each of the N redundancy groups, according to the number of times of addition up to now and the ordinary configuration information in said control table, define configuration obtained by replacing the information on the selected N partitions in said ordinary configuration information by information on the corresponding partitions of said added disk device to define as addition-caused configuration information in said control table, detect the difference between said ordinary configuration information and said addition-caused configuration information for each of said N redundancy groups by means of the copying position browsing section thereof so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate a new redundancy group by means of the redundancy group defining section thereof;

upon receiving a read command for said disk array from said host computer, the IO processing section of the disk array controller determining the disk device for reading data from by acquiring disk partition information on the redundancy group specified by said read command by means of said read position browsing section and executing the read operation by way of said disk control section and, upon receiving a write command for said disk array from said host computer, said IO processing section determining the disk device and the partition for writing data to by acquiring disk partition information on the redundancy group specified by said write command by means of said write position browsing section and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

71. The computer program product as set forth in claim 70, wherein, when said control table is referred to and updated, said copying processing section and said IO processing section of said disk array controller lock said control table by means of the exclusivity control section.

72. The computer program product as set forth in claim 70, wherein said predetermined RAID type is RAID5 (iD+P), where i is a positive integer not smaller than 2.

73. A computer program product embodied on a computer-readable medium and comprising codes that, when executed, cause a computer to perform a method of extending the storage capacity of a disk array device comprising a disk array controller connected to a host computer and a plurality of disk devices connected to the disk array controller to provide a disk array of a predetermined RAID type:

said disk array controller defining a control table having a configuration of storing a state flag indicating the state of said disk array of an addition of a disk in progress or not, the number of times of addition of a disk device, ordinary configuration information and addition-caused configuration information, said ordinary configuration information being so as to make the control table contain disk partition information indicating the disk device each of the partitions of each redundancy group belonging to, said disk array being so generated as to have the smallest number N of initial disk devices required for said RAID type and include N redundancy groups, each of said N redundancy groups having M sets of N partitions, M being a positive integer, formed by equally dividing the storage region of each of said initial disk devices by M×N, each of said partitions of each of said redundancy groups belonging to a disk different from the disks the other partitions of the redundancy group belong to;

at the time of extending the storage region of said disk array by adding an additional disk device having M×N partitions, each being formed by equally dividing the storage region thereof by M×N, the copying processing section of said disk array controller being adapted to select N different partitions for each of said M sets from the initial disk devices other than said new redundancy group generated as a result of extending the storage capacity, each of M×N partitions being selected from each of the N redundancy group, according to the number of times of addition up to now and the ordinary configuration information in said control table, define configuration obtained by replacing the information on the selected M×N partitions in said ordinary configuration information by information on the corresponding partitions of said added disk device to define as addition-caused configuration information in said control table, detect the difference between said ordinary configuration information and said addition-caused configuration information for each of said N redundancy groups of each of said M sets by means of the copying position browsing section thereof so as to define the differentiated partitions in the ordinary configuration as origin of copying partitions and define the differentiated partitions in the addition-caused configuration as destination of copying partitions so as to copy the data stored in the origin of copying partitions to the destination of copying partitions and, after the completion of the copying, exclude the origin of copying partitions from the original redundancy groups so as to incorporate the corresponding destination of copying partitions respectively into the original redundancy groups and combines the N origin of copying partitions excluded from the original redundancy groups to generate new a redundancy groups by means of the redundancy group defining section thereof;

upon receiving a read command for said disk array from said host computer, the IO processing section of the disk array controller determining the disk device and the partition for reading data from by acquiring disk partition information on the redundancy group specified by said read command by means of said read position browsing section thereof and executing the read operation by way of said disk control section and, upon receiving a write command for said disk array from said host computer, said IO processing section determining the disk device and the partition for writing data to by acquiring disk partition information on the redundancy group specified by said write command by means of the write position browsing section thereof and, if said state flag indicating "addition of disk", further determining the disk device and the partition for writing data to at the same time according to the disk partition information of the addition-caused configuration information differentiated from the disk partition information of the ordinary configuration information on the redundancy group specified by said write command.

74. The computer program product as set forth in claim 73, wherein, when said control table is referred to and updated, said copying processing section and said IO processing section of said disk array controller lock said control table by means of the exclusivity control section.

75. The computer program product as set forth in claim 73, wherein said predetermined RAID type is RAID5 (iD+P), where i is a positive integer not smaller than 2.

* * * * *